US012734445B2

(12) United States Patent
McCoy et al.

(10) Patent No.: US 12,734,445 B2
(45) Date of Patent: Sep. 15, 2026

(54) ANNOTATING PLAYER OR SPECTATOR SENTIMENT FOR VIDEO GAME FRAGMENT GENERATION

(71) Applicant: SONY INTERACTIVE ENTERTAINMENT LLC, San Mateo, CA (US)

(72) Inventors: Charles McCoy, San Mateo, CA (US); True Xiong, San Mateo, CA (US)

(73) Assignee: SONY INTERACTIVE ENTERTAINMENT LLC

( * ) Notice: Subject to any disclaimer, the term of this patent is extended or adjusted under 35 U.S.C. 154(b) by 226 days.

(21) Appl. No.: 18/382,934

(22) Filed: Oct. 23, 2023

(65) Prior Publication Data

US 2025/0128159 A1 Apr. 24, 2025

(51) Int. Cl.

| | |
|---|---|
| ***A63F 13/5375*** | (2014.01) |
| ***A63F 13/52*** | (2014.01) |
| ***A63F 13/86*** | (2014.01) |

(52) U.S. Cl.

CPC .......... *A63F 13/5375* (2014.09); *A63F 13/52* (2014.09); *A63F 13/86* (2014.09)

(58) Field of Classification Search

CPC ...... A63F 13/5375; A63F 13/52; A63F 13/86; A63F 13/46; A63F 13/497; A63F 13/67; A63F 13/79

See application file for complete search history.

(56) References Cited

U.S. PATENT DOCUMENTS

| | | | | |
|---|---|---|---|---|
| 11,420,123 | B2 * | 8/2022 | Wiggeshoff | A63F 13/86 |
| 2013/0212618 | A1 | 8/2013 | Schultz | |
| 2015/0046170 | A1 | 2/2015 | Doi et al. | |
| 2016/0057492 | A1 | 2/2016 | Jaffe et al. | |
| 2016/0078119 | A1 | 3/2016 | Aravkin et al. | |
| 2016/0156951 | A1 | 6/2016 | Perinchery et al. | |
| 2019/0099675 | A1 * | 4/2019 | Khan | A63F 13/211 |
| 2019/0336867 | A1 * | 11/2019 | Verma | A63F 13/67 |
| 2020/0129856 | A1 | 4/2020 | Bond et al. | |
| 2020/0387934 | A1 | 12/2020 | M V et al. | |
| 2021/0097584 | A1 | 4/2021 | Ranjan et al. | |
| 2021/0321168 | A1 | 10/2021 | Ganuthula | |
| 2021/0394059 | A1 * | 12/2021 | Rajkumar | A63F 13/426 |
| 2022/0301031 | A1 | 9/2022 | Iyer | |
| 2023/0056715 | A1 | 2/2023 | Cote et al. | |

(Continued)

OTHER PUBLICATIONS

PCT Application No. PCT/US2024/025752, International Search Report and Written Opinion dated Aug. 2, 2024.

(Continued)

*Primary Examiner* — Peter J Iannuzzi

(74) *Attorney, Agent, or Firm* — Kilpatrick Townsend & Stockton LLP

(57) ABSTRACT

A system includes a game recorder that records a first session of a video game, the first session including game state data generated by processing player input data by a video game processor, an input processor that identifies a location within the video game at which interest of one or more players or spectators exceeds a predetermined threshold, a trained machine learning model that determines a sentiment of the one or more players or spectators at the location based on live game feedback, and a storage device that associates an annotation of the sentiment with the game state data at the location within the video game.

40 Claims, 17 Drawing Sheets

(56) References Cited

U.S. PATENT DOCUMENTS

| | | | |
|---|---|---|---|
| 2023/0214706 A1 | 7/2023 | Rossi | |
| 2023/0222537 A1 | 7/2023 | Inamdar et al. | |
| 2023/0330542 A1* | 10/2023 | Marr | A63F 13/355 |

OTHER PUBLICATIONS

U.S. Appl. No. 18/374,368, True Xiong, Automatic Creation and Recommendation of Video Game Fragments, filed Sep. 28, 2023.
U.S. Appl. No. 18/382,933, Charles McCoy, Method and System for Creating and Sharing Video Game Annotations, filed Oct. 23, 2023.
PCT/US2024/025752, True Xiong, Automatic Creation and Recommendation of Video Game Fragments, filed Apr. 23, 2024.
PCT/US2024/048223, “International Search Report and Written Opinion”, Dec 31, 2024, 14 pages.

* cited by examiner 106
108
104
Cloud Gaming
Location 2
U2
U3
Location 3
U4
102
Internet
Location 4
Location 1
110
Cloud Gaming
Cloud Gaming
104
104
100
U5
U6
U7
U1

ANNOTATING PLAYER OR SPECTATOR SENTIMENT FOR VIDEO GAME FRAGMENT GENERATION

BACKGROUND

1. Field of the Disclosure

The present invention generally relates to video games. More specifically, the present invention relates to the annotation of player or spectator sentiment for generating video game fragments.

2. Description of the Related Art

In recent years, computer gaming has become a multi-billion-dollar business. However, competition for a user's time has never been fiercer. Some games require a time commitment that may exceed a user's availability in any given session. As a result, the user may avoid playing certain video games or even turn to a non-gaming activity, such as watching television, when it is perceived that there is insufficient time to play a lengthy video game. The ability to generate playable video game fragments or minigames would be a considerable advance over conventional approaches.

Unfortunately, the creation of video game fragments presents numerous challenges, not the least of which is identifying the portions of a video game that would be desirable to different players. For example, certain players may want to play the humorous portions of a video game, whereas other players may want to play the most exciting portions. Manual identification and generation of video game fragments is time-consuming may not always produce optimum results for a wide variety of players.

SUMMARY

Embodiments of the present invention include systems and methods for annotation of player and/or spectator sentiment in order to generate video game fragments. According to one aspect, a computer-implemented method includes recording a first session of a video game, the first session including game state data generated by processing player input data by a video game processor. The computer-implemented method further includes identifying a location within the video game at which interest of one or more players or spectators exceeds a predetermined threshold. The computer-implemented method also includes determining, by a trained machine learning model, a sentiment of the one or more players or spectators at the location based on live game feedback. In addition, the computer-implemented method includes associating an annotation of the sentiment with the game state data at the location within the video game.

In an example, identifying the location within the video game includes identifying an interest peak for the one or more players or spectators.

In another example, the live game feedback includes audio recorded by a microphone associated with a client device used to play the first session.

In yet another example, the live game feedback includes video recorded by a camera associated with a client device used to play the first session.

In still another example, the live game feedback includes motion recorded by a motion sensor associated with a client device used to play the first session.

As a further example, the live game feedback includes text recorded by an input device associated with a client device used to play the first session.

As an additional example, the live game feedback includes vital sign data recorded by a vital sign monitor associated with a client device used to play the first session.

In an example, the method further includes fragmenting the video game into a playable fragment including the location associated with the annotation.

In another example, fragmenting the video game includes generating a plurality of playable fragments of different lengths.

In yet another example, fragmenting the video game includes determining boundaries for the playable fragment within a gameplay context of the video game and generating the playable fragment having the determined boundaries.

In still another example, determining the boundaries is performed by the trained machine learning model or another machine learning model based on one or more of the annotation or the live game feedback.

As a further example, the method also includes obtaining one or more preferences of a player and identifying a playable fragment of the plurality of playable fragments that satisfies the one or more preferences.

As an additional example, the one or more preferences include a preferred sentiment for the playable fragment, and identifying the playable fragment includes identifying the playable fragment based on the sentiment of an associated annotation.

In an example, the one or more preferences include a preferred playing time for the playable fragment, and identifying the playable fragment includes identifying the playable fragment having a playing time that is within a threshold amount of the preferred playing time.

In another example, obtaining the one or more preferences includes determining at least one implicit preference of the player.

In yet another example, the at least one implicit preference includes a preferred playing time, and the preferred playing time is determined from at least one of player calendar data and player historical data.

In still another example, identifying the playable fragment includes identifying the playable fragment using the trained machine learning model or a second machine learning model based on a perceived match with the one or more preferences.

In a further example, the method also includes receiving feedback from the player relating to whether the playable fragment satisfied the one or more preferences and updating the trained machine learning model or the second machine learning model based on the feedback relating to the playable fragment.

In an additional example, the method further includes receiving feedback from a player of a second session of the video game relating to whether the annotation correctly described the sentiment of the player at the location and updating the trained machine learning model based on the feedback.

In yet another example, the method also includes generating a timeline of annotations for the first session that satisfy a set of criteria provided by a player, receiving a selection by the player of a first annotation from the timeline, and performing at least one of: launching a second session of the video game at the location of the video game associated with the annotation or displaying recorded screen output of the first session of the video game at the location of the video game associated with the annotation.

According to another aspect, a system includes a game recorder that records a first session of a video game, the first session including game state data generated by processing player input data by a video game processor. The system also includes an input processor that identifies a location within the video game at which interest of one or more players or spectators exceeds a predetermined threshold. The system further includes a trained machine learning model that determines a sentiment of the one or more players or spectators at the location based on live game feedback. The system additionally includes a storage device that associates an annotation of the sentiment with the game state data at the location within the video game.

In an example, the input processor identifies the location within the video game by determining an interest peak for the one or more players or spectators.

In another example, the live game feedback includes audio, and the system further includes a microphone associated with a client device used to play the first session that records the audio.

In yet another example, the live game feedback includes video, and the system further includes a camera associated with a client device used to play the first session that records the video.

In still another example, the live game feedback includes motion, and the system further includes a motion sensor associated with a client device used to play the first session that records the motion.

In an additional example, the live game feedback includes text, and the system further includes an input device associated with a client device used to play the first session that receives the text.

In a further example, the live game feedback includes vital sign data, and the system further includes a vital sign monitor associated with a client device used to play the first session that records the vital sign data.

As another example, the system further includes a game fragment generator that fragments the video game into a playable fragment including the location associated with the annotation.

As yet another example, the game fragment generator fragments the video game into plurality of playable fragments of different lengths.

As still another example, the game fragment generator determines boundaries for the playable fragment within a gameplay context of the video game and generating the playable fragment having the determined boundaries.

In an example, the game fragment generator uses or includes an artificial intelligence (AI) engine including the trained machine learning model or another machine learning model that determines the boundaries based on one or more of the annotation or the live game feedback.

In another example, the system further includes a preference analyzer that obtains one or more preferences of a player and identifies a playable fragment of the plurality of playable fragments that satisfies the one or more preferences.

In yet another example, the one or more preferences include a preferred sentiment for the playable fragment, and the preference analyzer identifies the playable fragment by identifying the playable fragment based on the sentiment of an associated annotation.

In still another example, the one or more preferences include a preferred amount of playing time for the playable fragment, and the preference analyzer identifies the playable fragment by identifying the playable fragment having a playing time that is within a threshold amount of the preferred playing time.

As an additional example, the preference analyzer identifies the one or more preferences by determining at least one implicit preference of the player.

As a further example, the at least one implicit preference includes a preferred playing time, and the preferred playing time is determined by the preference analyzer from at least one of player calendar data and player historical data.

As another example, the preference analyzer includes or uses an artificial intelligence (AI) engine including the trained machine learning model or a second machine learning model to identify the playable fragment based on a perceived match with the one or more preferences.

As still another example, the AI engine receives feedback from the player relating to whether the playable fragment satisfied the one or more preferences and updates the trained machine learning model or the second machine learning model based on the feedback relating to the playable fragment.

As yet another example, the AI engine receives feedback from a player of a second session of the video game relating to whether the annotation correctly described the sentiment of the player at the location and updates the trained machine learning model based on the feedback.

In an additional example, the system further includes a game launcher that generates a timeline of annotations for the first session that satisfy a set of criteria provided by a player, receives a selection by the player of a first annotation from the timeline, and performs at least one of: launching a second session of the video game at the location of the video game associated with the annotation; or displaying recorded screen output of the first session of the video game at the location of the video game associated with the annotation.

DETAILED DESCRIPTION

The following embodiments describe methods and systems for creating and sharing video game annotations for one or more video games or video game fragments.

It will be understood, however, to one skilled in the art, that the present invention may be practiced without some or all of these specific details. In other instances, well known process operations have not been described in detail in order not to unnecessarily obscure the present invention.

Figure 1A:
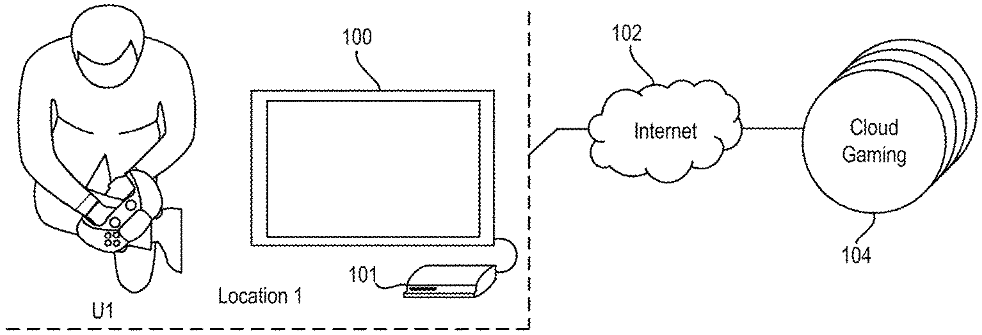
FIG. 1A illustrates a user playing a cloud-based video game.

FIG. 1A illustrates a user playing a cloud-based video game. As shown, a user U1 plays a cloud-based video game shown on a display 100. A cloud-based video game is a video game that is substantially executed on a remote server. A server, in one embodiment, can include individual servers or servers that are executed in a virtual machine data center, where many servers can be virtualized to provide the requested processing.

In the illustrated embodiment, cloud gaming server(s) 104 execute the video game that is rendered on the display 100. A client 101 is situated at the user's location to receive and process inputs and communicate these to the cloud gaming servers 104, and also to receive video and audio data from the cloud gaming servers 104. The client 101 and the cloud gaming servers 104 communicate over a network 102, such as the Internet. In other embodiments, the client can be any device, whether portable or not, whether wireless or not, so long as the client can communicate with a network and provide access to a display for rendering game play and enable input from a user to drive interactivity. In one embodiment, the client is a thin client. However, in other embodiments, the client can be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, a virtual reality (VR) or augmented reality (AR) system, or any other computing device capable of being configured to fulfill the functionality of a client as defined herein. In one embodiment, the cloud gaming server is configured to detect the type of client device, which is being utilized by the user, and provide a cloud-gaming experience appropriate to the user's client device. For example, image settings, audio settings and other types of settings may be optimized for the user's client device.

In various embodiments, the degree of processing performed by the client may vary with respect to input and output processing. However, in some cases, the video game state is substantially maintained and executed on the cloud gaming servers 104, with the client primarily functioning to receive and communicate user inputs, and receive video/audio data for rendering. The client 101 may be a standalone device that is connected to the display 100 and provides video data for rendering on the display 100. In other embodiments, the client can be integrated into the display 100. In one embodiment, the display 100 is a networked display providing a platform operating system for applications or "apps" utilizing the network connectivity of the display. In such an embodiment, the client can be defined by an application executed on the platform provided by the display's operating system.

Figure 1B:
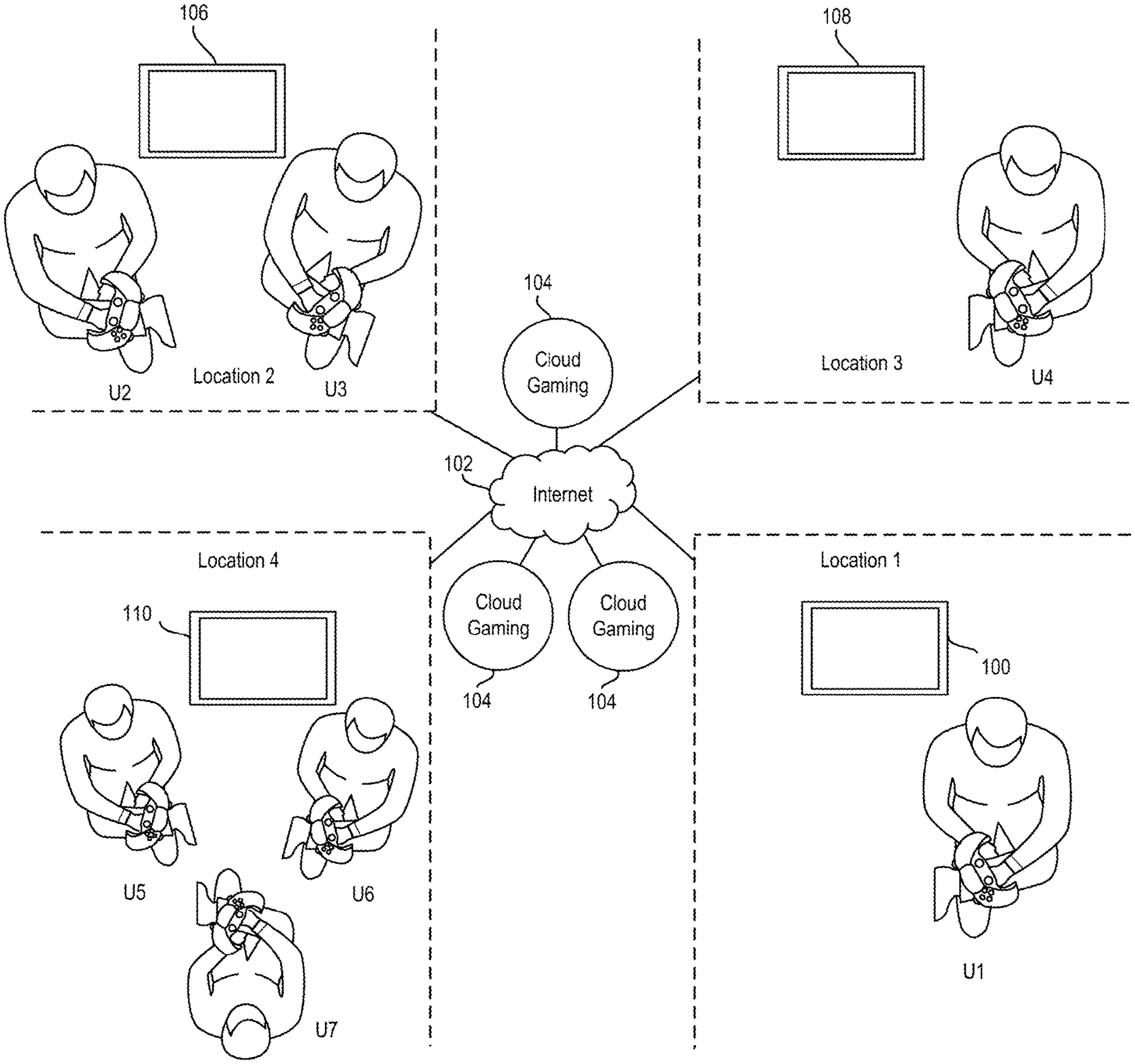
FIG. 1B illustrates multiple users in multiple locations engaged in gameplay of cloud-based video games.

FIG. 1B illustrates multiple users in multiple locations engaged in gameplay of cloud-based video games. The user U1 is shown at a first location interacting with a video game rendered on the display 100. Users U2 and U3 are shown at a second location interacting with a video game rendered on a display 106. A user U4 is shown at a third location playing a video game rendered on a display 108. Users U5, U6, and U7 are shown at a fourth location interacting with a video game rendered on a display 110.

At each of the first, second, third, and fourth locations, at least one computing device is provided for processing input from the various users and rendering a cloud-based video game on their respective displays. It should be appreciated that the computing device can be integrated into a display, or may be a standalone device such as a personal computer, set top box, gaming console, VR headset, or any other type of device having at least one processor and memory for processing and storing data. The computing device can execute or define a client, as has been described above. The computing devices are networked and communicate over the network 102 with cloud gaming servers 104. In some cases, a single computing device in a location can perform processing for more than one user. In other cases, each user in a location can have a computing device performing processing dedicated to that user, which may be combined with other computing devices at that location.

The cloud gaming servers 104 execute the various video games that are being played by the users, defining a given video game's game state from moment to moment, and sending video data (including image data and audio data) to a computing device at a particular location. The computing device at a given location processes input from the user(s) playing the video game, and transmits input data to the cloud gaming server, which in turn processes the input data to affect the game state of the video game. It should be appreciated that cloud-based gaming facilitates multi-player gaming from players located at various locations by providing for execution of the video game at a remote server that is accessible by all players over a network. In this manner, execution of the video game is not dependent on any single player's hardware or network conductivity, although such will affect the user experience for that given player.

Figure 2:
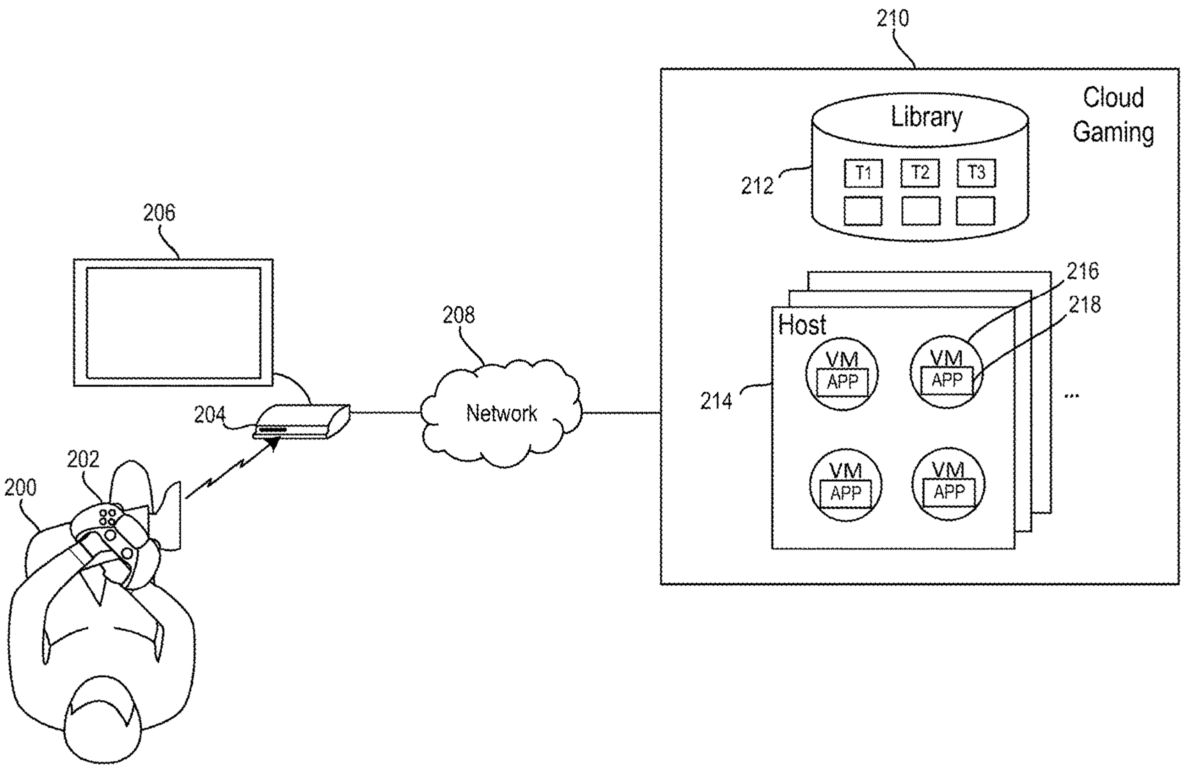
FIG. 2 illustrates a system for cloud gaming.

FIG. 2 illustrates a system for cloud gaming. As shown, a user 200 operates a controller 202 to provide input to a cloud-based video game. The controller 202 can include any of various kinds of input devices, such as buttons, joysticks, a touchpad, a trackball, a VR headset and/or VR controllers, as well as motion sensing hardware, such as accelerometers, magnetometers, and gyroscopes. In one embodiment, the controller 202 can include an illuminated object that can be tracked to determine the location of the controller 202. The controller 202 can communicate wirelessly with a thin game client 204. The client 204 communicates over a network 208 with a cloud gaming service 210. The client 204 processes data from the controller 202 to generate input data that is communicated to a video game executed by the cloud gaming service 210. Additionally, the client 204 receives video data from the cloud gaming service 210, for rendering on the display 206. In one embodiment, the client 204 may process the received video data to provide a video stream in a format compatible with the display 206. In one embodiment, the client 204 can include a camera for tracking a controller device or an object located on the controller device. As has been noted, the object can be illuminated to further facilitate tracking based on analysis of captured image frames from the camera.

The cloud gaming service 210 includes resources for providing an environment in which a video game can be executed. Broadly speaking, resources can include various kinds of computer server hardware, including processors, storage devices, and networking equipment, which can be utilized to facilitate execution of a video game application. In the illustrated embodiment, a video game library 212 includes various game titles. Each game title defines executable code as well as associated data and asset libraries which are utilized to instantiate a video game. The host 214 can be a single computing device that defines a platform for instantiating virtual machines 216. In another embodiment, the host 214 can itself be a virtualized resource platform. In other words, the host 214 may operate over one or more server computing devices, handling the allocation and usage of the resources defined by the server computing devices, while presenting a unified platform upon which virtual machines 216 can be instantiated.

Each virtual machine 216 defines a resource environment which can support an operating system, upon which a video game application 218 can be run. In one embodiment, a virtual machine can be configured to emulate the hardware resource environment of a gaming console, with an operating system associated with the gaming console being run on the virtual machine to support the running of game titles which were developed for that gaming console. In another embodiment, the operating system can be configured to emulate a native operating system environment of a gaming console, though the underlying virtual machine may or may not be configured to emulate the hardware of the gaming console. In another embodiment, an emulator application is run on top of the operating system of a virtual machine, the emulator being configured to emulate the native operating system environment of a gaming console to support video games designed for that gaming console. It should be appreciated that a variety of current and legacy gaming consoles can be emulated in a cloud-based gaming system. In this manner, a user can access game titles from different gaming consoles via the cloud-gaming system.

When the user 200 requests to play a specific video game title, the video game title is retrieved from the library 212. If a compatible virtual machine has not been already instantiated or is not available for use, then a new compatible virtual machine is instantiated on the host 214. In some cases, if a game has not been already instantiated or is not available for use, then a new game can be instantiated on a dedicated host for performance and security reasons. The retrieved video game title is then executed as an application 218 on the available or newly instantiated virtual machine 216. In one embodiment, this can entail determining the appropriate platform for the video game title (e.g., which gaming console or operating system the game requires to run) and assigning the video game title to an appropriate virtual machine for execution, e.g., one having an emulator application capable of handling execution of the video game title. The executing video game communicates with the game client 204 to provide an interactive gaming experience for the user 200. More specifically, the executing video game application 218 receives input data from the client 204 over the network 208. The application 218 processes the input data to update the game state of the executing application. As the game state changes, the application 218 outputs video data that is sent to the client 204 for rendering on the display 206. Additionally, the application 218 may also output feedback data to the client 204 that is utilized to provide an additional feedback mechanism to the user. By way of example, the user's controller 202 may include a tactile vibration feedback mechanism that can be activated based on the output feedback data from the video game application.

In one embodiment, the cloud gaming system is configured to detect the type of client device associated with the user, and also a type of controller available for the user to provide input to the cloud-based video game. For example, in one embodiment, when a user logs in to the cloud gaming system, they may be presented with an option to designate the type of client device with which they are accessing the cloud gaming system. In one embodiment, a series of client device options are presented from which the user may select one corresponding to their client device. The user may also be presented with an option to designate the type of controller device they will use to play a video game. In one embodiment, a series of controller options can be presented to the user, from which the user may select to designate a controller type corresponding to their controller hardware. In other embodiments, the cloud gaming system can be configured to automatically detect the client device type and/or the controller device type.

For example, at the time of login, the client device may send information to the cloud gaming server identifying itself as well as a connected controller device (e.g., in response to a request from the cloud gaming server). Based on this information, the cloud gaming server may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse or a VR headset and associated VR controllers. In such a scenario, the input parameter configuration can define a mapping from inputs which can be generated by the user's available controller device to inputs which are acceptable for the execution of the video game. In some cases, a service may utilize local hardware instead of, or in addition to, running the game on a cloud gaming server 104. In some cases, a cloud gaming server 104 may coordinate between multiple local hardware devices that are running code for the same gaming session.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlayed during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud gaming server via a network (e.g., accessed via a local networking device such as a router). However, in other embodiments, the controller can itself be a networked device, with the ability to communicate inputs directly via the network to the cloud gaming server, without being required to communicate such inputs through the client device first. For example, the controller might connect to a local networking device (such as the aforementioned router) to send to and receive data from the cloud gaming server. Thus, while the client device may still be required to receive video output from the cloud-based video game and render it on a local display, input latency can be reduced by allowing the controller to send inputs directly over the network to the cloud gaming server, bypassing the client device.

In one embodiment, a networked controller and client device can be configured to send certain types of inputs directly from the controller to the cloud gaming server, and other types of inputs via the client device. For example, inputs whose detection does not depend on any additional hardware or processing apart from the controller itself can be sent directly from the controller to the cloud gaming server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud gaming server. These might include captured video or audio from the game environment that may be processed by the client device before sending to the cloud gaming server. Additionally, inputs from motion detection hardware of the controller might be processed by the client device in conjunction with captured video to detect the position and motion of the controller, which would subsequently be communicated by the client device to the cloud gaming server. It should be appreciated that the controller device in accordance with various embodiments may also receive data (e.g., feedback data) from the client device or directly from the cloud gaming server. In some cases, data from input devices can be processed by a local computing device, which can then provide the results of that processing instead of, or in addition to, all or part of the raw data. Transmitting the result of processing can significantly reduce the bandwidth of data that needs to be transmitted. For example, eye tracking sensor data can be processed to determine the results of that processing, such as focus point on the display, displayed object focused on, blinking, eye opening amount, rate of eye movements, and/or determined emotions. As another example, data from a video camera can be analyzed to identify gestures made by the user. The identified gestures can be transmitted to the cloud while access to the raw data from the video camera can be limited to just the local computing device. In some cases, transmitting the result of processing raw data from user input devices instead of the raw data can result in better privacy for the user.

Figure 3:
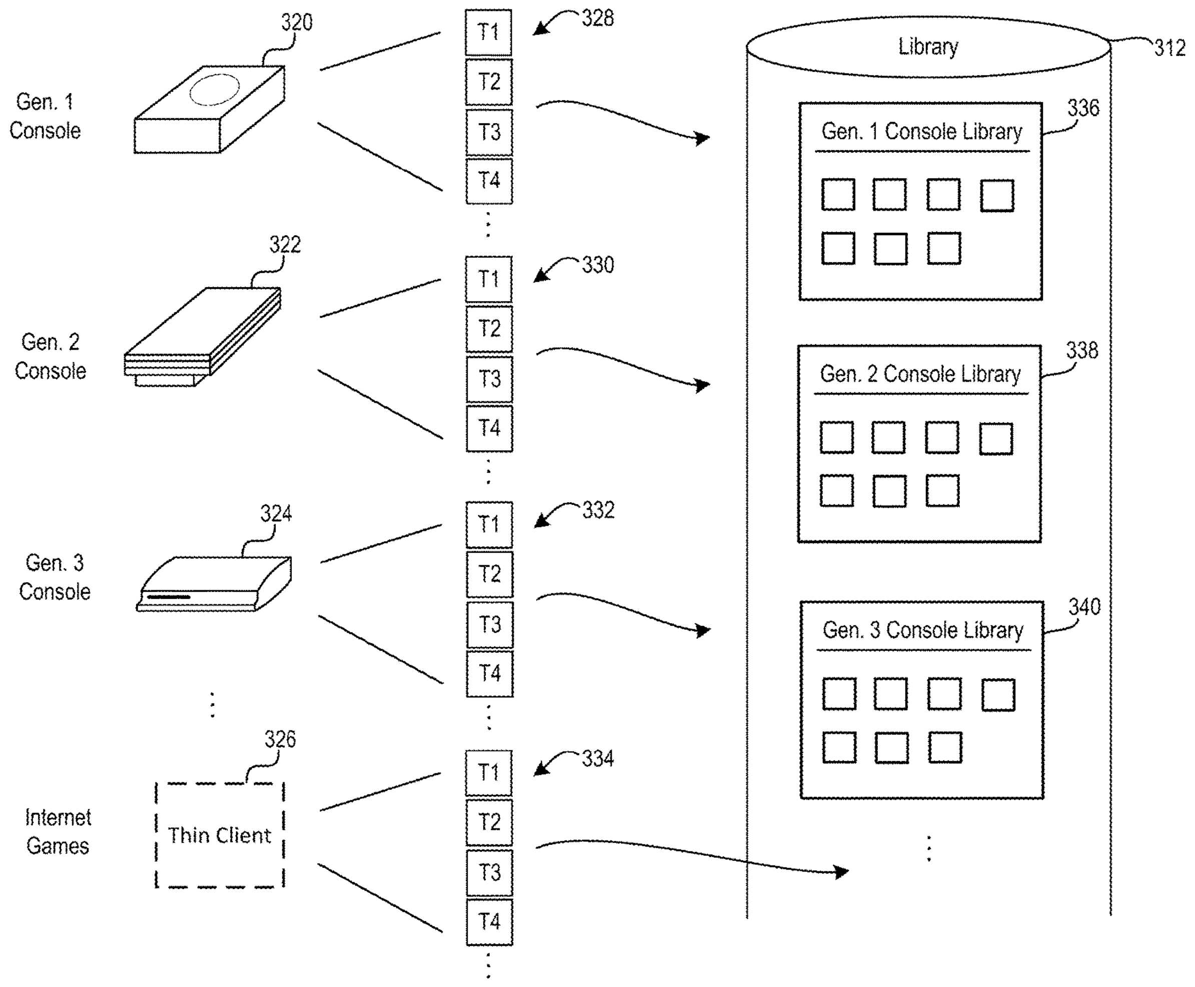
FIG. 3 illustrates the accumulation of game titles across various generations of gaming consoles.

FIG. 3 illustrates the accumulation of game titles across various generations of gaming consoles. In the video gaming industry, video games are developed for specific video game consoles. Over time a library of game titles is amassed for a specific game console. For example, in the illustrated diagram, a first generation console 320 has a collection of game titles 328 which have been developed for it. A second-generation console 322 has associated there with a collection of game titles 330 which have been developed for it. And a third-generation console 324 is also shown, having a collection of game titles 332 developed for it. In other embodiments, there may be a collection of game titles 334 which have been specifically developed as cloud-based games for use in conjunction with a client 326. Furthermore, other types of games such as Internet games can be developed and collected for distribution over a cloud gaming system, as is described herein. It will be appreciated that game titles from different generations of game consoles can be collected and consolidated in the cloud gaming library 312. As shown, the library 312 includes a first generation console library 336 which includes the game titles which have been developed for the first generation console 320. In a similar manner, the library 312 also includes a second-generation console library 338 and a third generation console library 340 which contain video games that have been developed for the second and third generation consoles, respectively. Games which have been developed for the client 326 and other types of games such as Internet games can also be included in the game library 312. As can be seen, many game titles from across various generations of video gaming consoles can be amassed and made available via a cloud gaming library. As has been described, each of these games can be executed on a virtual machine that simulates the operating system environment associated with a given gaming console for which a game was developed. In this manner, users accessing the cloud-based gaming system can easily access and play games from across many different consoles as well as games from other contacts such as Internet games and games which have been specifically developed for use with the cloud-based gaming system. Some console generations may have the capability to play games that were created for another console generation or another gaming system. Some game titles may be targeted to be playable on multiple console generations or multiple gaming systems. Some game titles that are not owned by the player may be temporarily available for the player to play, such as through a subscription, demo, or limited use game fragment.

Figure 4A:
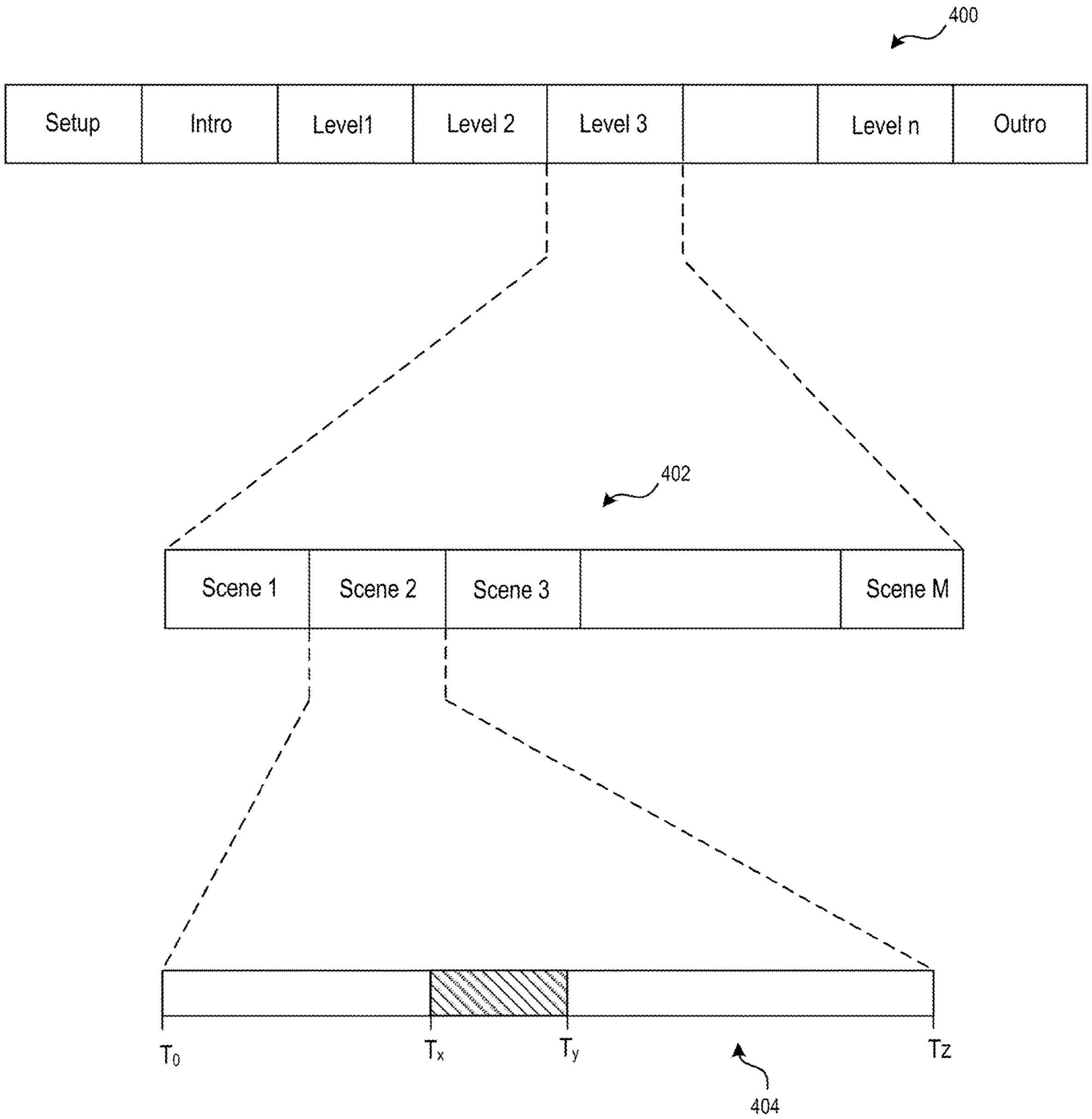
FIG. 4A illustrates the hierarchical organization of various portions of a video game.

FIG. 4A illustrates the hierarchical organization of various portions of a video game. By way of example, a video game can be organized into various sections 400. In the illustrated embodiment, these may include a set up section, an introduction section, various level sections, and an outro section. A given level may be further divided into various scenes. As shown, the level 3 section is broken down into various scenes 402. In some cases, a game level may be hierarchical, containing other game areas. For example, a game level may contain a continent, which may contain a town, which may contain a magic shop, where each of those nested game levels may contain scenes. As the user plays through a given scene, a gameplay timeline of that scene can be recorded, including recorded video of the user's gameplay as well as recorded input data and game states (e.g., variables) of the executed game application. In the illustrated embodiment, the gameplay timeline 404 is representative of the user's gameplay of scene 2 of level 3 of the game. In some cases, the game play opportunities available to play are different in different game areas, levels, times, or other game fragments, such as puzzles, combat challenges, or crafting. The game play opportunities available may differ based on the game state when playing the particular portion of the game, such as the chosen character class, guild membership, previous NPC interactions, items equipped, the character's inventory, or skills learned by the character. In some cases, game fragments can be identified based on activities preferred by a player and what game fragments and game states provide those activities.

In one embodiment, a user may select portions of their recorded gameplay from which to generate a minigame or game fragment. For example, in the illustrated embodiment, the gameplay timeline 404 has a start time $T_0$ and an ending time $T_z$. A portion of the gameplay timeline from a time $T_x$ to a time $T_y$ has been selected from which to generate a minigame. In some cases, games provide the player with a choice of activities to do or areas to explore. In such a case, scenes 402 and/or portions of the gameplay timeline 404 can be identified and used to create one or more playable game fragment that will provide the player with the game play activities and/or areas they are likely to enjoy. In other embodiments, as described with reference to FIG. 7D, game fragments can be automatically generated using machine learning based on the gameplay of various past users and offered to a particular user in accordance with explicit or implicit preferences about that user's time availability, skills, and interests.

Figure 4B:
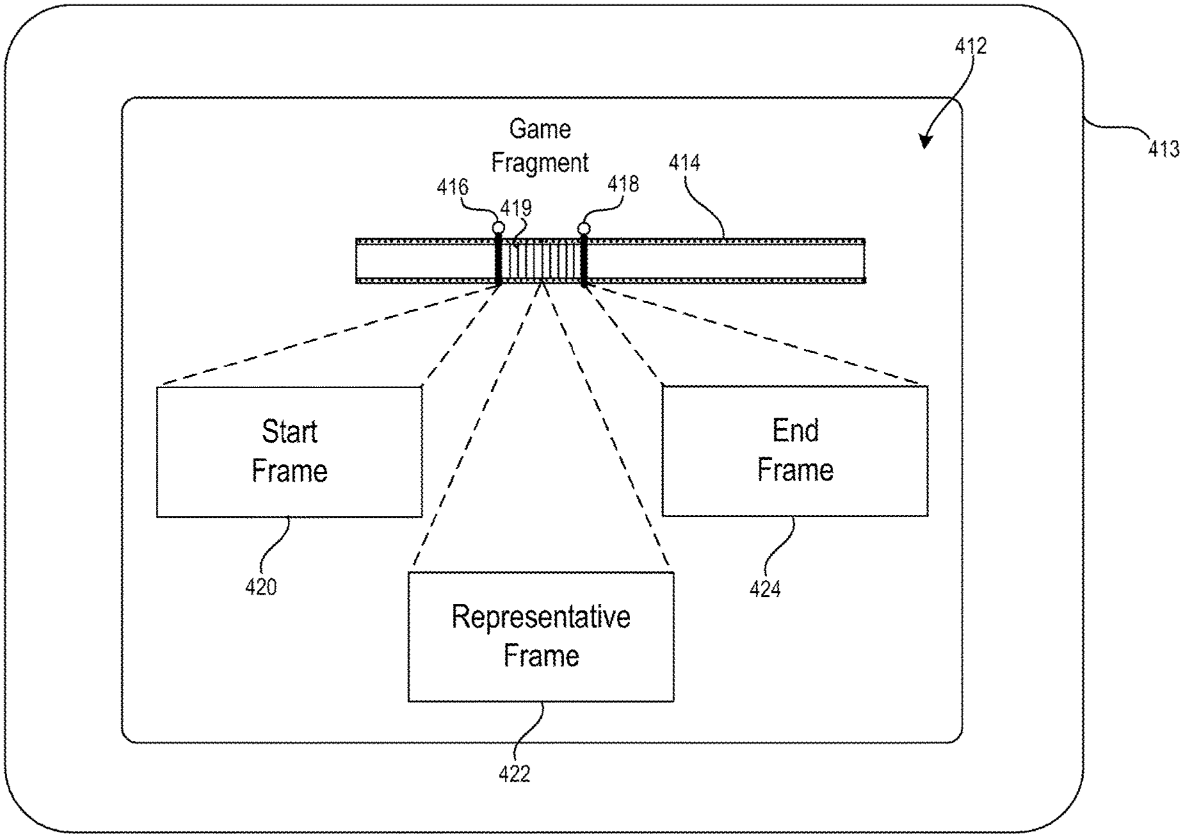
FIG. 4B illustrates an interface for selecting a portion of a gameplay timeline for generation of a game fragment or minigame.

FIG. 4B illustrates an interface for selecting a portion of a gameplay timeline by a user for generation of a minigame or game fragment. In the illustrated embodiment, the interface 412 is presented on a touchscreen of a device 413, such as a tablet computing device. However, in other embodiments, the interface 412 could be presented on a television, VR headset, or other display device. The interface 412 includes a selectable gameplay timeline 414. The gameplay timeline 414 is represented as a film strip with adjustable markers 416 and 418. The marker 416 designates the start point along the gameplay timeline 414 of the selection, whereas the marker 418 designates the endpoint along the gameplay timeline of the selection. Furthermore, a marker 419 can be positioned within the portion of the gameplay timeline 414 that has been founded by the start marker 416 and the end marker 418. For ease of use and to provide the user with a visual understanding of what portion of their gameplay is being selected, a start frame 420 can be shown corresponding to the point along the gameplay timeline at which the marker 416 has been positioned. The start frame 420 is an image of the recorded gameplay video corresponding to the time at which the start marker 416 is positioned. Likewise, a representative frame 422 is an image of the recorded gameplay video corresponding to the time at which the marker 419 is positioned. In a similar manner, the end frame 424 is an image of the recorded gameplay video corresponding to the time at which the end marker 418 is positioned. The representative frame 422 can be utilized as a representative image for the game fragment that is created based on the selected portion of the gameplay timeline 414. Although a touchscreen interface is provided and described, in other embodiments, various other kinds of input can be utilized to select starting and ending points to define a portion of gameplay for creation of a game fragment. For example, input can be provided via a game controller, a keyboard, VR controller, gesture input, voice input, and in accordance with other types of input devices and mechanisms to enable selection of a portion of gameplay along with selection of a representative image frame from the recorded gameplay video.

In some embodiments the selection markers may not be continuously adjustable along the gameplay timeline but may be configured instead to snap to pre-defined time points along the gameplay timeline. For example, predefined time points may be defined to correspond with specific events occurring in the gameplay timeline. The specific events of a given gameplay timeline for which predefined time points will be assigned can be generated based on analysis of the users gameplay and will depend on the specific architecture of the video game gameplay. In one embodiment, predefined time points can be assigned based on geographical location of a character within a virtual world defined by the video game. For example, predefined time points can be assigned to the specific times at which a character moved from one geographical locale to another geographical locale, e.g., movement from one scene location to another scene location, movement from one city to another city, entering a structure, entering a room within a structure, entering the vehicle, entering a different type of environment, or any other geographical transition of significance. In another embodiment, predefined time points can be assigned based on development of a user's character or entity which is controlled in the video game. For example, predefined time points can be assigned when a character or entity controlled by the user accomplishes a task, acquires a skill, acquires an object, passes a level or otherwise completes a portion of the video game, or performs or achieves any other significant activity in the video game. In some cases, a playable game fragment may begin when an event in-game is triggered, such as the appearance of a boss monster, the player triggering a trap, or an earthquake occurring.

Figure 5A:
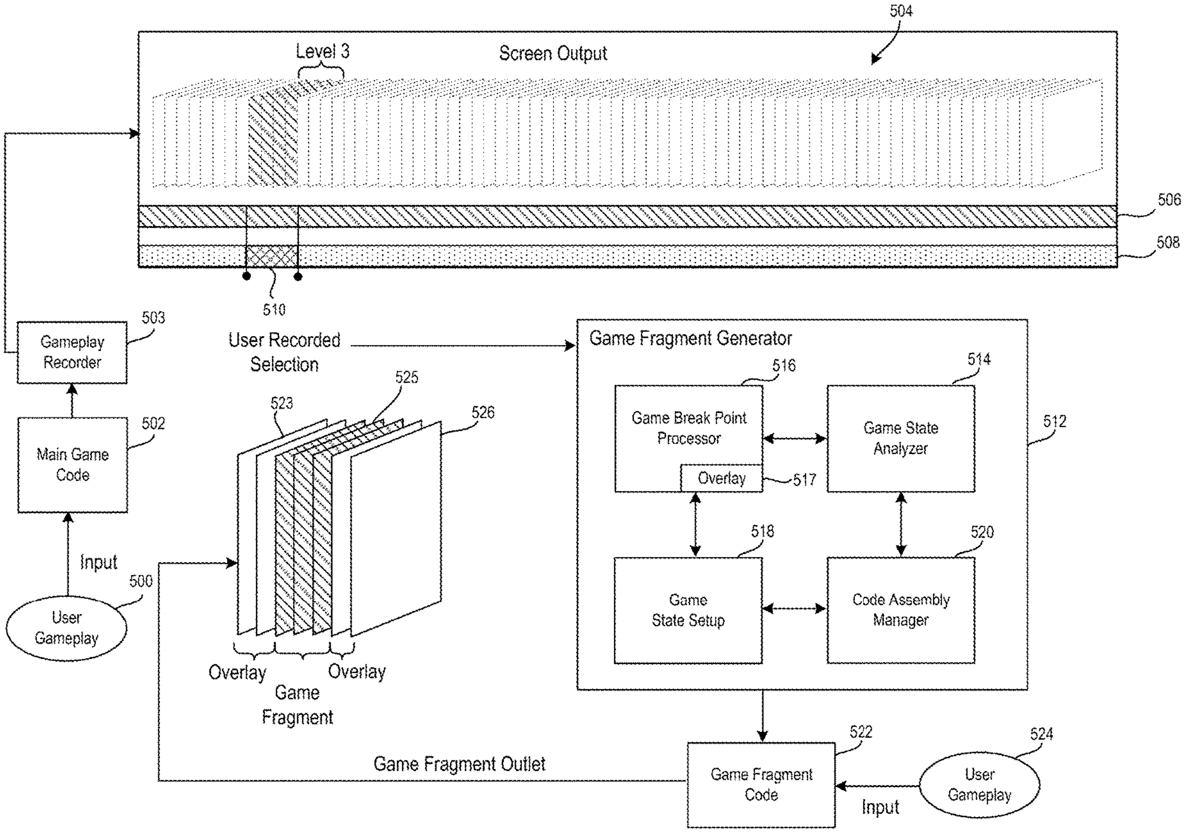
FIG. 5A illustrates a system for generating game fragment code for a playable minigame.

After a user has selected a portion of gameplay from which to create a game fragment, a playable minigame based on the selected portion of gameplay may be created, as described in further detail with respect to FIG. 5A. More specifically, the game fragment enables the user or another user to replay or play substantially the same portion of the video game later, and possibly under substantially the same conditions and parameters. In this sense, the game fragment is more than simply a replay video of the original user's gameplay, but is a playable portion of the video game, itself. A subsequent user may thus experience a substantially similar gameplay experience to that of the original user without having to play through the video game in a linear fashion. In some cases, a subsequent user may experience a similar gameplay experience to that of the subsequent users in a non-linear fashion; the user may replay or play a game fragment from any of the predecessor or subsequent users.

FIG. 5A illustrates a system for generating game fragment code. The terms game fragment and minigame are used interchangeably herein to define a discreet and playable portion of a video game that is generated from existing recorded gameplay. In the illustrated embodiment, the user gameplay 500 conceptually represents a user interacting with a full version of a video game. The user could be a human player or, in some embodiments, an AI player that plays the video game in a sequential fashion from the beginning.

Main game code 502 is executed to define the full version of the video game. As the video game is played, it generates several types of gameplay output, including video data, game state data, and user input data. These can be recorded by a gameplay recorder 503 to define the user's recorded gameplay. In the illustrated embodiment, an image stream of screen output 504 conceptually represents the video data output by the video game. Game state data 506 and user input data 508 are also shown. The game state data 506 includes data defining the game state of the executing video game from moment to moment during gameplay. In some cases, the game state data can allow starting game play for a game fragment at a finer level of specificity than predefined starting points, up to being able to choose any frame of the recording in which to start playback. The game play can begin using the same game state that existed during the recorded game play or may be modified in the generation of a game fragment. In some cases, game state data from locations other than the starting point for a game fragment can be included in the game fragment to provide game play of the game fragment that more closely matches the game play in the recording. For example, if the player opens a chest in the selected portion of the recording and the chest contains items randomly determined by the game when the chest is opened, that random determination can be included in the game state and used in the game fragment. In other words, if the player opens the same chest during play of the game fragment, the items chosen to be in the chest when they open it will be the same items that were chosen during the recorded game play.

The user input data is data generated by capturing user initiated actions occurring during interactivity with the video game, such as may be provided via activation of input devices on controller devices, detection of sensor data (e.g., motion sensors), captured audio input, and the like. In some cases, the user input data may contain data from user interactions with things other than the video game, such as the user's interactions with a different game title or preferences the user specifies in a game system user interface.

Game state data can include the values of any variables which define the execution state of the video game. For example, the game state data may include position variables indicating the X, Y, and Z positions of an object in a virtual space of a video game such as a character or a vehicle. Camera angle variables indicate the direction of a virtual camera or virtual view in the video game. In one embodiment, the camera angle is defined by an azimuth component measured (e.g., along a horizontal plane) relative to and azimuth reference and an inclination component measured relative to an inclination reference (e.g., relative to vertical). Action variables indicate the initiation and sustaining of various actions within the video game. It should be appreciated that actions for a given video game will be specific to the context of the video game. By way of example, actions could include the initiation of specific maneuvers, the application of skills, the triggering of modification mechanisms that modify an existing action such as increasing its level of intensity or frequency, etc., or any other type of action or activity that can be triggered by user input during the course of the video game. A weapon variable indicates the triggering of a weapon the video game. A health variable indicates a level of health of, for example, a user's character in the video game. Button variables indicate the state of buttons on a controller device, e.g., whether the button is in a depressed state or in a released statement. Joystick state variables in the illustrated embodiment indicate a magnitude of movement of a joystick relative to a neutral position. The foregoing game state variables are merely exemplary, and it will be recognized by those skilled in the art that many other types of game state variables can be tracked over time As has been described, a user interface can graphically depict the user's recorded gameplay to facilitate selection by the user of a portion of the user's gameplay from which to generate a game fragment. In the illustrated embodiment, the user has defined a selection from their recorded gameplay representing a game fragment 510. This selection of the user's recorded gameplay is utilized by a game fragment generator to generate game fragment code 522 which defines a limited game based on the selected portion of the user's gameplay. The game fragment generator 512 includes a game state analyzer 514, which analyzes the game state of the game fragment 510. Based on the analysis of the game state of the recorded selection, a game breakpoint processor 516 determines appropriate breakpoints to define the beginning and ending of the game fragment. Breakpoints can be defined based on geography, time, task or goal accomplishment, scene boundaries (physical or temporal), or any other aspect of a video game according to which the video game's gameplay can be segmented to generate a game fragment. A brief description of some illustrative embodiments will serve to highlight certain possibilities for breakpoint determination.

For example, some video games entail control of a character that can be moved from one geographic scene or locale to another scene or locale. The selected portion of the user's gameplay may be determined to be generated from gameplay at a particular scene. In such an embodiment, the boundaries of the particular scene can define the geographic breakpoint for the game fragment, selecting the scene to the exclusion of other scenes, which can entail exclusion of other adjacent or adjoining scenes, as well as scenes which are non-adjacent or non-adjoining or otherwise less related or unrelated to the particular scene. It should be appreciated that the game fragment 510 may entail gameplay from multiple scenes, in which case, the game breakpoint processor 516 may be configured to define breakpoints according to the boundaries of the multiple scenes which are utilized for the recorded gameplay selection. In some cases, the selected game fragment 510 is used to create a playable game fragment that limits game play to the portion of the game that was played in the selected game fragment. In some cases, the playable portion of a playable game fragment created based on a selected game fragment 510 can include portions of the game other than portions that were played in the selected game fragment 510. In one example, the playable game fragment can be used as a starting point for game play that allows access to all of the game title. In another example, the game fragment will allow playing the portion of the game that was played along with other related game content, such as game content that would have been played in the game state getting to the game fragment, adjoining game locations, the remainder of any game level included in the game fragment, or time-based restrictions. In some cases, multiple selected game fragments 510 can be used in the generation of a single playable game fragment, such as to create a game fragment that allows access to the game play done in the multiple game fragments 510.

It should be noted that a scene can be based on data that is geographic, temporal, and/or game state in nature. That is, the scene may not only define a geographic region within a virtual space defined by the video game but may also be configured to exist during a certain time or at a particular chronological point within the larger context of the video game. Such a scene may have game aspects that are determined by game state data, such as if the player is a member of a guild, performed a particular action previously, or the items the player has equipped. Such a scene may have defined objectives or goals that are to be accomplished by the player. Thus, game breakpoints can be defined based on chronology or other temporal aspects as defined by the video game.

Furthermore, a given scene may have associated objects or features which are presented as part of the scene during gameplay. These objects or features may be analyzed to define further breakpoints according to their inclusion. For example, the objects in the scene may be taken from a subset of an asset library, in which case the subset of the asset library can be defined for the game fragment by the game breakpoint processor 516, to the exclusion of other objects in the asset library which are not utilized in the scene(s) associated with recorded gameplay selection. Objects and features can be dynamic elements of a given scene, with associated mechanisms defining their change in response to events occurring in the video game. For example, an object might have a damage modeling module that determines and adjusts the appearance of the object when it is damaged (e.g., when struck by a weapon). A feature could be a vehicle that is made available during the scene, with the vehicle having associated logic which defines its appearance during gameplay as well as its operation and response to user input. Such logic or damage modeling can further define game breakpoints for generation of the game fragment.

Various aspects of a video game which define or are otherwise utilized for a selected portion of a video game can be the basis for defining a game breakpoint. The presently described examples are provided by way of example only and not by way of limitation. It should be appreciated that in other embodiments, other aspects of a video game can form the basis for defining breakpoints to generate a game fragment.

In one embodiment, a video game may be organized into various scenes, which normally must be completed in a linear fashion, such that a later scene cannot be attempted until its preceding scene has first been completed. Each scene can include a number of objectives or goals, some of which may be required for completion of the scene, and some of which may be optional for completion of the scene. Objectives can include navigating from a starting location to a predefined ending location within the scene, surviving for a predefined length of time, destroying a predefined number of enemies, acquiring a certain number of points, defeating a particular enemy, solving one or more puzzles, and/or any other activity which can define an objective within the game. A scene may have various predefined completion points, that is, points wherein the user, once having achieved the completion point, is able to return to that point if the user becomes unable to continue gameplay for some reason (e.g., the user quits the game, the user's game character dies or runs out of lives or health, the user's vehicle crashes, etc.). At predefined completion points, a video game may be configured to automatically save the user's progress or present an option for the user to save their progress.

In one embodiment, the game breakpoint processor 516 is configured to define a game breakpoint at predefined completion points. In one embodiment, this is accomplished by finding the nearest completion points to the selected start and end points of the user's recorded gameplay selection, and utilizing these nearest completion points to define the game breakpoints for the game fragment. In another embodiment, the nearest completion point occurring before the selected start point of the recorded gameplay selection is utilized to define a starting breakpoint, whereas a nearest completion point occurring after the selected end point of the recorded gameplay selection is utilized to define an ending breakpoint for the creation of the game fragment. In still another embodiment, if a completion point lies within a predefined radius of (e.g., either before or after) either of the start or end points of the user's recorded gameplay selection, then that completion point is utilized to define a corresponding start or end game breakpoint for the game fragment. Whereas if no completion point lies within the predefined radius, then a game breakpoint is defined that more closely matches the user's selected start or end point for the recorded selection. In other embodiments, the predefined radius for the start and end points may differ for purposes of determining whether to utilize an existing completion point to define a game breakpoint.

As has been discussed, the game breakpoint processor 516 determines appropriate breakpoints applicable to various aspects of the video game based on analysis of the recorded gameplay selection. The breakpoints defined by the processor 516 serve to define the limited scope of the game fragment that will be produced based on the recorded gameplay selection. In one embodiment, an overlay processor 517 is provided for generating overlays that may contribute to an improved user experience when playing the game fragment generated by the game fragment generator 512. For example, in one embodiment the overlay processor 517 defines pre-game fragment data which defines video or gameplay or additional information that can be provided as an introduction to the game fragment prior to actual gameplay of the game fragment. One example of pre-game fragment data is an introductory video which can provide context to a user who initiates gameplay of became fragment. In another embodiment, pregame fragment data can define introductory gameplay for the game fragment that may provide a user an opportunity to learn skills that may be useful or required for playing game the fragment. In another embodiment, pregame fragment data may define a series of one or more informational screens or images which provide information about the game fragment to the user. Such information may include controller configuration, story background information, objectives or goals, maps, or any other type of information relating to the game fragment which may be useful for the user or otherwise improve the user's experience of playing the game fragment.

The overlay processor 517 can also be configured to define postgame fragment data. In some embodiments, the postgame fragment data can define video or images to be shown following completion of game play of the game fragment. For example, a congratulatory video might be shown after a user completes the game fragment. Such a video may be customized based on the user's gameplay of the game fragment, for example, by showing information or images that are based on the user's gameplay. In one embodiment, the postgame fragment data can define a playback mechanism to play recorded portions of the user's gameplay of the game fragment following its completion. In another embodiment, the postgame fragment data can be configured to display statistics about the gameplay of the game fragment and may indicate a comparison of the gameplay to that of other users or that of the original creator of the game fragment. In still other embodiments, the postgame fragment data can define additional interactive elements to be presented to the user upon completion of the game fragment. These may include options to purchase in part or in whole the video game upon which the game fragment is based, redirect options to additional sources of information relating to the video game, etc.

In some embodiments, the overlay processor 517 can be configured to define elements which are overlaid into the game fragment. These may include elements that may be customized by a user playing the game fragment, such as customization of characters, objects, properties, annotations, and other types of customization options. In some embodiments, the overlay processor 517 may be configured to define simplified elements for a game fragment to reduce the complexity of the game fragment code and the amount of resources required to execute the game fragment. By way of example, many video games include artificial intelligence (AI) entities such as characters, vehicles, enemies, etc. These AI entities may in the full video game be governed by artificial intelligence models that define the reaction and activity of the AI entities based on events occurring in the video game. However, in the context of a game fragment which is of limited scope, it may be acceptable to simply define the activity of an AI entity through hardcoded definition or simplified extrapolations, rather than fully modeling the activity of the AI entity as would be the case in the full video game. In some cases, modifications may be made to a game fragment before it is played. For example, a player may be allowed to change how the character is equipped before starting play. As another example, AI might modify the game state for the fragment to optimize the game play that will result when playing the game fragment to be more likely to align with the player's game play preferences. Another example would allow a player to modify a character's appearance before playing the game fragment. A player may be allowed to modify other portions of the game state, such as the options chosen the last time the player interacted with an NPC or how the player chose to spend points when leveling up the character. In some cases, a game state, or portions of the game state, from one or more other game fragment or portion of a game recording can be used to alter the game state in a game fragment before it is played, such as to replace the character in a game state in the game fragment with the character from a different game state. The entire game state may be replaced before playing a game fragment.

For example, if in the recorded gameplay selection of the full video game a given AI character moves in a certain manner according to its AI model that is unlikely to change in the game fragment, then it may be more efficient to define an approximation of the AI character's movement for the game fragment. Such an approximation would not require the full AI model to be included as part of the game fragment code, yet would provide to the user playing the game fragment a substantially similar experience with respect to that AI character to that of the original user's gameplay from which the game fragment was generated. The resource savings realized through approximation of AI entities activity can be even more significant when multiple AI entities are present and interacting in the user's recorded gameplay selection. For each of the AI entities may have AI models that depend upon the output of those of the other AI entities. However, when gameplay has been recorded the activity of each of these AI entities is known, and therefore can be reproduced in the game fragment through simplified mechanisms such as direct encoding of their controlling variables and approximation of their activity.

With continued reference to FIG. 5A, a game set up state processor 518 is provided for defining an initial state of the game fragment. Based on the operation of the game state analyzer 514, the game breakpoint processor 516, and the game set up state processor 518, a code assembly manager 520 assembles various code portions to define the game fragment code 522. When the game fragment code 522 is executed, user gameplay 524 provides input to define the state of execution of the game fragment code, which produces gameplay output including video data and feedback data for rendering the game fragment to the user. The video data can include pregame fragment overlay video 523, game fragment video 525 which is the video resulting from gameplay of the game fragment, and postgame fragment overlay video 526.

It should be appreciated that in one embodiment, the game fragment code 522 is fully self-contained, including all code portions which are required to execute the game fragment. However, in other embodiments, the game fragment code 522 may incorporate references or pointers to existing code portions in the main game code of the full video game. Furthermore, the game fragment code 522 may include reference or utilize existing assets in asset libraries of the main game code of the full video game. However, in other embodiments, new asset libraries can be generated for the game fragment code.

In one embodiment, the game state analyzer 514 can be configured to analyze the game state data 506 of a user's recorded gameplay. Based on the analysis of the user's recorded gameplay, various regions of interest of the user's recorded gameplay can be defined and presented to the user as possible selections from which to generate a game fragment. For example, a region of gameplay characterized by elevated levels of activity for certain game state variables might define a selection of the user's recorded gameplay. It should be appreciated that the level of activity for a given game state variable can be based on numerous factors such as a level of intensity, a frequency of activation, a number of replays, etc. In some embodiments, the analysis of the game state variables can entail searching for regions of gameplay wherein the levels of activity of two or more different game state variables are correlated in a predefined manner, e.g., the two or more variables have elevated levels of activity simultaneously. A high level of activity can be determined based on a predefined threshold. In certain embodiments, a frequency or intensity of live (contemporaneous) feedback from a user (e.g., audible feedback) can be used to identify regions of gameplay for possible selection, either by a user or by machine learning.

In various embodiments, a region of interest of the user's recorded gameplay may be automatically determined based on threshold detection of any one or more of the following: one or more user inputs, rate of user input, frequency of input, repeats of types of inputs, occurrences of input patterns, combination inputs (e.g., combo keys), motion vectors, pressure exerted on a controller, and/or implicit feedback, e.g., excitation of a user based on captured image or audio data of the user. Another type of feedback from the user can be utilized, such as the amount of time spent playing aspects of the game (including different game areas or different types of play), like crafting vs. hunting monsters, ratings given by the user (which may be detailed to aspects of their game play or game play recordings), analysis of the player activity in an area compared to activities enjoyed by the player, or determinations, which can be generated by AI analysis, of the amount of enjoyment the player has for particular game play experiences or game aspects. Other types of feedback may be inferred from subsequent users that play that game fragment, including their own feedback (as mentioned above) in term of similarities and variances. The variance range can be statistically calculated to arrive at a score of user's interest.

Figure 5B:
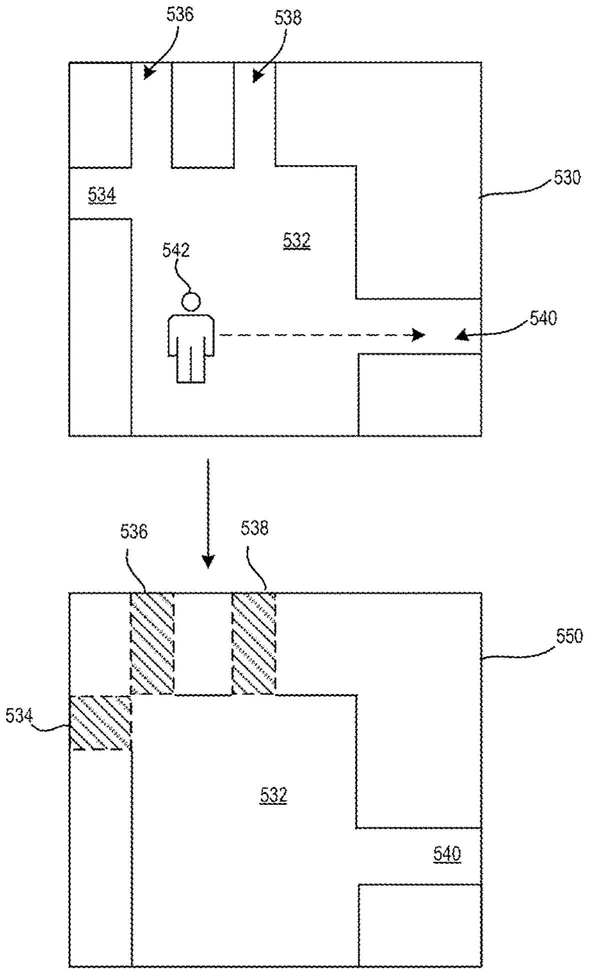
FIG. 5B illustrates modification of a virtual space for purposes of generating a game fragment.

FIG. 5B illustrates modification of a virtual space for purposes of generating a game fragment of a video game. The map 530 represents a scene or a geographical portion of a video game. The map as shown is a two-dimensional representation that may be representative of a three-dimensional virtual space that is navigated and experienced during actual gameplay of the video game. As shown, the map 530 illustrates a region 532, and several paths 534, 536, 538, and 540. In the recorded gameplay of the video game, a user's character 542 moves from the region 532 to the path 540. Based on this recorded movement and other analysis of the gameplay of the video game, it may be determined that the additional paths 534, 536, and 538 are not necessary for generation of the game fragment. The paths may represent incorrect choices as compared to the path 540 or may lead to areas that are not relevant to the game fragment, or may detract from a game fragment player's ability to follow the path and experience similar gameplay to that of the original user. Further, if the areas to which the paths 534, 536, and 538 lead are not to be supported in the game fragment, then the inclusion of such paths could cause confusion among players, or at the least be a poor user experience. Therefore, in a modified map 550, the paths 534, 536, and 538 are made unavailable for gameplay in the game fragment, whereas the path 540, as well as the region 532 remain unchanged. Thus, when a user plays the game fragment that incorporates the topography defined by the map 550, he will experience a virtual space wherein the paths 534, 536, and 538 are not available to traverse. The user will then be more likely to traverse the path 540 as the original user did, thus experiencing similar gameplay.

It will be appreciated that the portion of a virtual space defined for a game fragment or minigame can be defined by boundaries which are determined based on the user's recorded gameplay. The boundaries will define a sub-region of the larger virtual space and include a subset of the features which are available in the larger virtual space. In some embodiments, virtual space boundaries can be determined by determining locations in the virtual space defined by the user's gameplay, and then determining predefined boundaries associated with the virtual space that are nearest to those locations and arranged to encompass them. For example, a user's gameplay may define a path traversed by a user's video game character. This path can be analyzed and based on the path's location in the virtual space, a set of predefined boundaries can be selected to define a region encompassing the path. In some embodiments, predefined boundaries can be defined by specific features which inherently define portions of the virtual space, e.g., doors, windows, walls, rooms, hallways, fences, roads, intersections, hallways, etc.

Figure 5C:
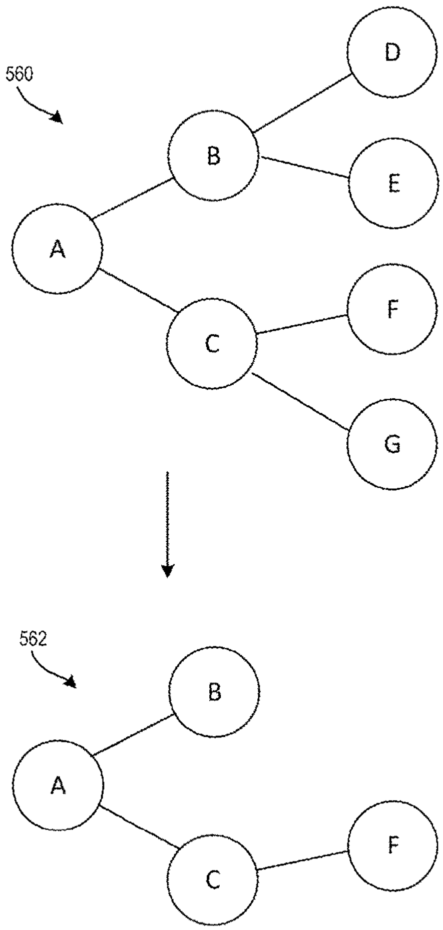
FIG. 5C illustrates modification of a scene graph for purposes of generating a game fragment.

FIG. 5C illustrates modification of a scene graph for purposes of generating a game fragment. A scene graph 560 conceptually illustrates the organization of various scenes A through G of a video game. It should be appreciated that scenes as described herein can be geographic and/or temporal in nature, and each may represent a playable portion of a video game, such as a stage, a level, a section, a location, or any other organizational unit within the video game according to which a player may progress from one scene to another scene. In the scene graph 560, various nodes are shown representative of the scenes A through G. As shown, a player may progress from scene A to scene B, and from scene B to either of scenes D or E. The player may also progress from scene A to scene C, and from scene C to either of scenes F or G. The scene graph 560 is illustrative of the scene organization of the full video game. However, for purposes of creating a game fragment, not all of the available scenes may be required to the game fragment. Thus, by way of example, a scene graph 562 illustrates the organization of scenes for a game fragment. As shown, the scene graph 562 includes scenes A, B, C, and F, but not the remaining scenes which were included in the scene graph 560 of the full video game. Thus, a user may progress from scene A to either of scenes B or C, and from scene C to scene F. However, the other scenes from the full video game scene graph 560 are not available for gameplay in the game fragment. As has been described, systems in accordance with embodiments of the invention can be configured to limit the inclusion of scenes when generating a game fragment. In this manner, the game fragment does not include scenes which are not required for the limited context of its gameplay and intended purpose.

Figure 6A:
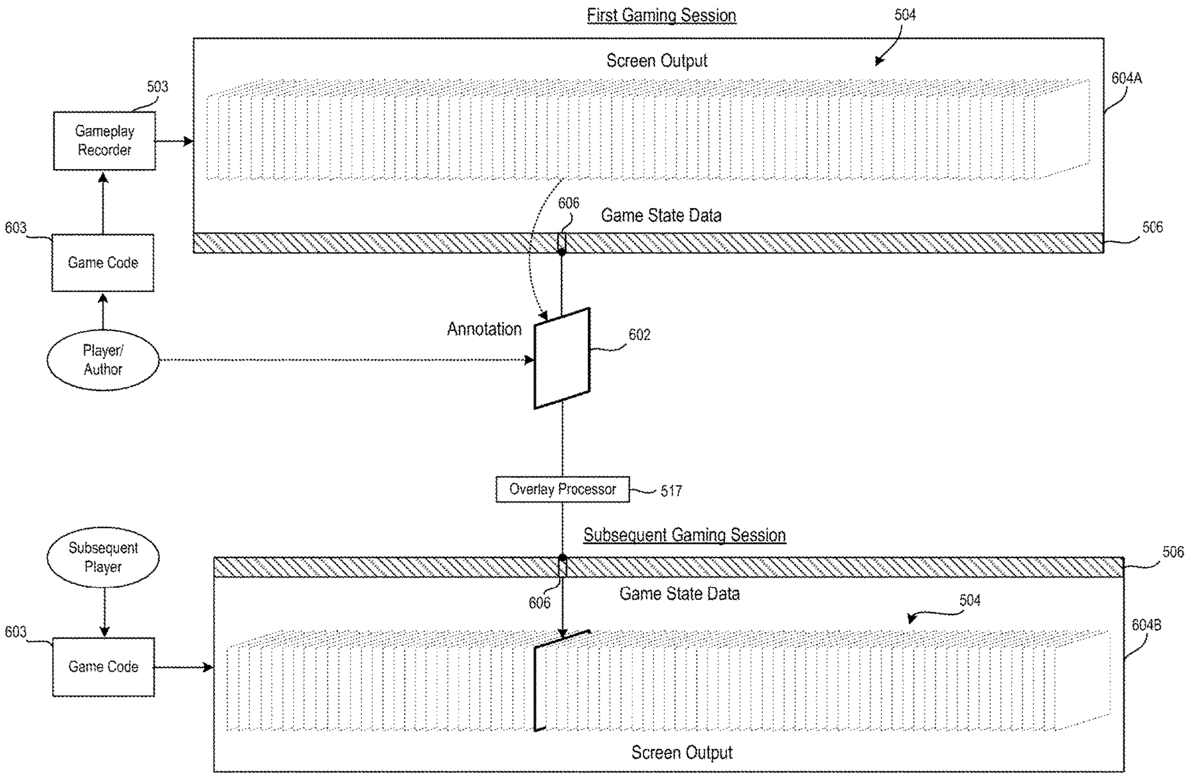
FIG. 6A illustrates a process of annotating recorded gameplay.

FIG. 6A illustrates a process of annotating a recorded gameplay session to produce an annotation 602 capable of being presented at a selected point in a subsequent gameplay session. The annotation 602 may be created by a player playing a particular game or game fragment (e.g., game code 603), another player, or an automated process. In some cases, annotations may be contributed by spectators watching game play, or analysis of behavior of spectators watching game play, which may be done by artificial intelligence (AI).

As illustrated, the player's gameplay in a first gaming session 604B is recorded by a gameplay recorder 503, as described in relation to FIG. 5A. The recorded gameplay includes screen output 504 and game state data 506 generated by processing user input data using a video game processor (shown in FIG. 9). The game state data 506 includes set of variables relating to the gameplay, such as, without limitation, a current section, scene, level, temporal location, or spatial location within the video game, one or more attributes of a character within the video game, including gaming statistics, achievements won and/or problems solved, the location and status of various non-player characters (NPCs) within the game, and/or the like. In some cases, game state data may be determined by analyzing game rendering output, such as to detect the health level shown in the game rendering video, determine the enemies in a battle from analyzing the video rendering video, or detect a low-health warning sound in the game rendering audio. Such analysis may be performed by artificial intelligence (AI).

An annotation 602 may include video, audio, graphics, text, highlighting, and/or metadata, which may be supplied by the creator of the annotation 602 (i.e., its "author"), taken from the screen output 504 and/or game state data 506, provided by a game developer, and/or created by an automated process. The metadata may include some of the game state data 506, which may be used to subsequently launch the game at a different point, as described in greater detail below. The metadata may also include screen coordinates to facilitate on-screen highlighting and/or positioning of the video, text, graphics, and/or highlighting of the annotation 602 on a display screen. In some cases, game state data may include information received from the game title in addition to the output rendering of the game play, such as current score, position on the map, or player health. In some cases, game state data may be derived from analysis of the game rendering output, which may include artificial intelligence (AI) analysis, to determine things from the game rendering output, such as player health, enemy health, ammunition level, how the character is equipped, or enemies the player is engaged with.

The annotation 602 may be linked to or associated with a particular point, location, or segment of the video game. In some embodiments, the point is defined by a particular game state 606, i.e., a subset or instance of the changing game state data 506 in the recorded gameplay session. As described in greater detail hereafter, once an annotation 602 is linked to a point within the video game, the annotation 602 may be presented (e.g., displayed, played, executed) when the game code 603 is played in a subsequent gaming session 604B in response to one or more triggering conditions. For example, a video or text annotation 602 may be overlayed on the subsequent gaming session 604B and/or screen output 504 of the subsequent gaming session 604B may be wholly or partially replaced with the annotation 602. In some embodiments, this may be accomplished by means of the overlay processor 517 discussed in connection with FIG. 5A or using a different module that is part of, or operates in concert with, the game code 603 or the game operating system.

The triggering condition may include that a second player plays the game code 603 to the same point in the subsequent gaming session 604B, such that at least some of the game state 606 of the subsequent gaming session 604B matches at least some of the game state 606 of the first gaming session 604A to which the annotation 602 was linked. For example, if the annotation 602 is associated with a game state 606 in which a level variable is set to level 3, the triggering condition may include that the level variable transitions to level 3 in the subsequent gaming session 604B.

The triggering condition may also include the second player choosing to see the annotation 602 after being prompted that the annotation 602 is available. In other words, presentation of the annotation 602 might not be automatic. Rather, the second player may receive a notification during the subsequent gaming session 604B that an annotation 602 is available. The notification could be audible (e.g., a sound), visual (e.g., an displayed icon), haptic (e.g., a vibration in a game controller or VR headset), and/or the like. The second player may signal a desire to have the annotation 602 presented by activating a designated control on the game controller or selecting from an on-screen menu. Of course, the triggering condition may be significantly more complex and may involve any number of variables or states within the game state data 506 and include combinatorial logic.

The annotation 602 may be presented only for the author, for a different player that plays the video game, or particular players under select conditions. As an example, a subsequent player might need to subscribe to the author's annotations 602 in order for the annotation 602 to be displayed. Alternatively, the author may need to share the annotation 602 (or a link thereto) with the subsequent player and/or otherwise enable the subsequent player to unlock the annotation 602 in order for it to be presented in the subsequent gaming session 604B.

Figure 6B:
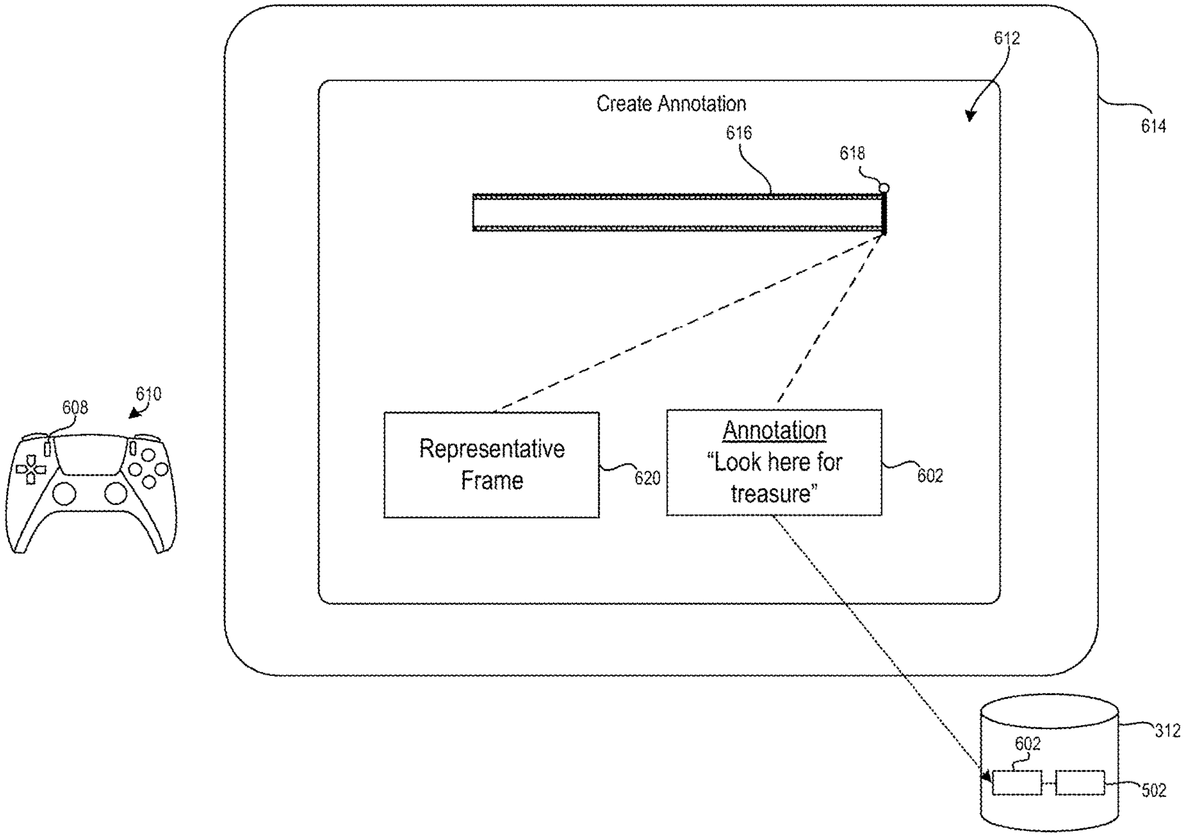
FIG. 6B illustrates a user interface for annotating recorded gameplay.

In one embodiment, the annotation 602 may be created while the author is playing the first gaming session 604. For example, as shown in FIG. 6B, the author may press a share button 608 on a game controller 610, which may temporarily pause the video game and display a menu (not shown) from which the player may select an option for creating the annotation 602 (in other embodiments, the first gaming session 604A may have been recorded by another player or by an automated process). In response, the author may be presented with an interface 612 on the display device 614, which may be a television, tablet device, smartphone, VR headset, or the like. In some cases, the annotation 602 is created by the game system as the author is playing, which may be done in response to setting particular settings before the game play session. In some cases, the annotation 602 may be based on game play by the author and augmented by the author after the game play, such as to add commentary to the game play or edit the game play to exclude less interesting parts and/or highlight more interesting parts.

The interface 612 may include a selectable gameplay timeline 616, which represents recorded gameplay, as discussed in connection with FIG. 5A, and may be graphically represented in the interface 612 as a filmstrip. The gameplay timeline 616 may be associated with at least one adjustable marker 618. The adjustable marker 618 may be initially displayed at the end of the gameplay timeline 616 by default representing the last frame of screen output 504 recorded in the recorded gameplay. The frame at the point represented by the adjustable marker 618 may be displayed in another location of the interface 612 as a representative frame 620 to aid with navigating the gameplay timeline 616 and selecting the point for insertion of the annotation 602. The author may move the adjustable marker 618 along the gameplay timeline 616 to mark a specific location within the recorded gameplay, which has the effect of displaying the corresponding representative frame 620.

Either before or after the author has selected the point within the game for the annotation 602, the author may select and/or provide the audio, video, text, graphics, highlighting and/or metadata for the annotation 602. In a simple case, the author provides text for the annotation 602 via the game controller 610 using a displayed virtual keyboard (not shown). For example, the author may type, "look here for treasure." In some cases, the audio, video, text, graphics, highlighting and/or metadata may be taken from the recorded gameplay.

After the content and location for the annotation 602 is provided or selected, the author may create the annotation 602 by pressing the share button 608 again or by making a selection from an on-screen menu (not shown). Thereafter, the created annotation 602 becomes linked to or associated with the point in the video game (and the corresponding game state 606) represented by the adjustable marker 618 in relation to the gameplay timeline 616.

As used herein, the term "linked" does not imply that any reference is inserted into the game code 603 (although this is possible in some embodiments). Rather, an indication of a point within the game code 603 and/or at least some of the game state 606 at the insertion point of the annotation 602 may be stored in or associated with the annotation 602. In one embodiment, the created annotation 602 containing the reference or game state 606 is stored in connection with the game code 603 in the game library 312 shown in FIG. 3, such that it may be accessed by the overlay processor 517 during a subsequent gaming session 604B and presented as part of the screen output 504 in response to the triggering condition.

Figure 7A:
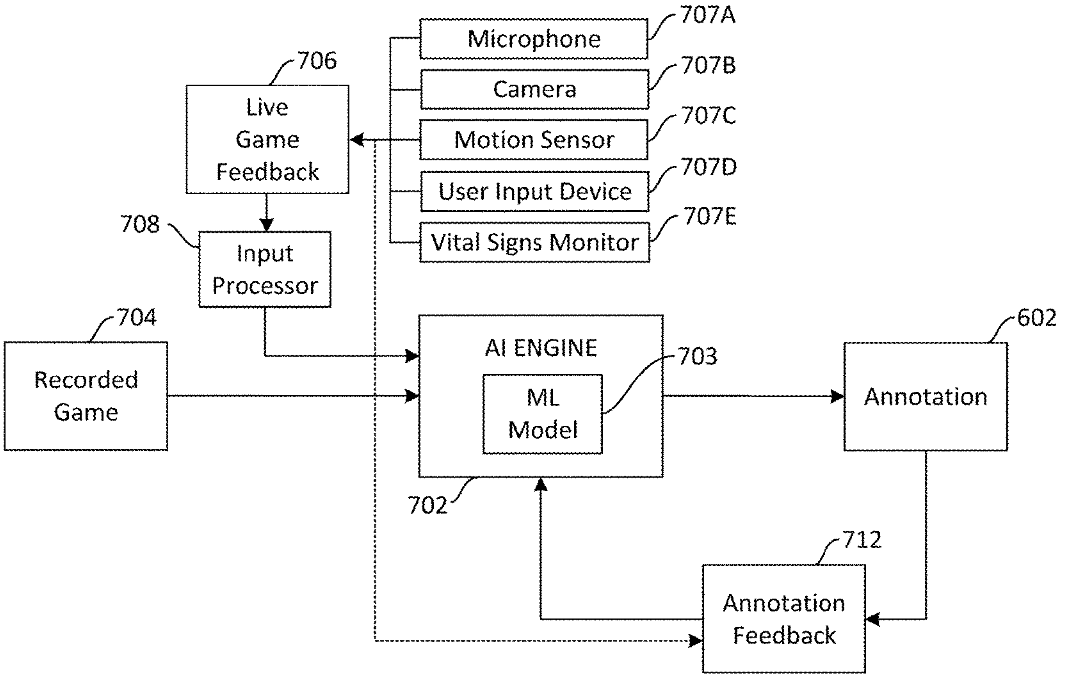
FIG. 7A illustrates a system for automatically generating annotations including player and/or spectator sentiment.

Referring to FIG. 7A, annotations 602 may be generated by an automated process, i.e., using machine learning (ML). Such annotations 602 may include any of the types of annotations 602 previously described. Another type of annotation 602 may indicate the sentiment (e.g., emotions, attitudes, feelings) of one or more players that played the video game and/or one or more spectators that watched the video game being played. Annotations 602 conveying player and/ or spectator sentiment may be used, for example, to create playable game fragments or minigames, as described in greater detail hereafter.

In certain embodiments, an artificial intelligence (AI) engine 702 may receive various input including, without limitation, a recorded game 704 (e.g., the output of the game recorder 503) and live game feedback 706 of one or more players and/or spectators of the recorded game 704. The AI engine 702 may include or have access to a trained ML model 703, such as, without limitation, a large language model (LLM), bi-directional transformer, zero/few shot learner, or deep neural network (DNN). The ML model 703 may be used by the AI engine 702 to predict the sentiment of one or more players or spectators at various points within the video game at which annotations 602 documenting the sentiment may be inserted. In some cases, sentiment may be determined based on sensor feedback of one or more spectators, such as through analysis of data from one or more microphone and/or camera. In some cases, sentiment may be determined by user input, such as a user indicating an emoji or text comment in response to game play. In some cases, sentiment may be segmented based on spectator demographics, such as to divide spectator sentiment based geographically or based on spectator experience or history with the game being spectated. Sentiment determination through such means may be used to train machine learning models to determine sentiment from game play without need for player feedback or observation. In some cases, sentiment determination may be based on sensors focused on a group of spectators, such as a camera and/or microphone observing a group of spectators watching an e-sports tournament.

Figure 7B:
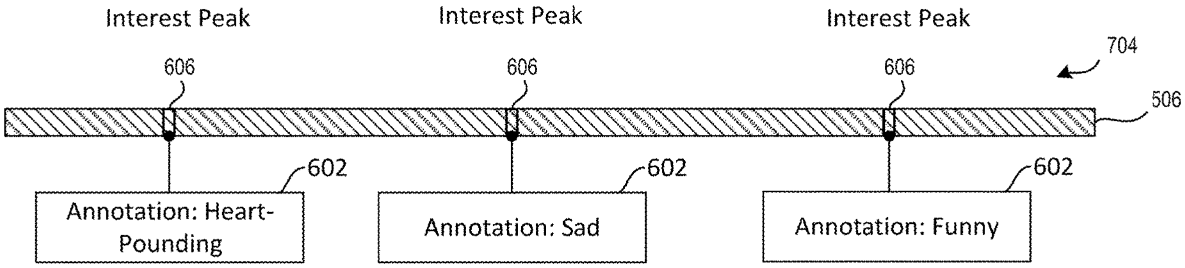
FIG. 7B illustrates various annotations of player and/or spectator sentiment at interest peaks within a video game.

In some embodiments, not every expression of player/spectator sentiment may result in an annotation 602. Rather, annotations 602 may be inserted at points in the recorded game 704 at which levels of interest, as reflected in the live game feedback 706, exceed a predetermined threshold (i.e., an interest "peak"). For example, referring also to FIG. 7B, various interest peaks and corresponding annotations 602 of sentiment are illustrated at different points of the recorded game 704. The annotations 602 are associated with different game states 606, which are, themselves, portions of the game state data 506 of the recorded game 704. In various embodiments, some or all of the game state 606 may be stored or associated with the annotation 602 in order to allow the video game to be launched at the point associated with the annotation 602 in the manner of a saved game. In one embodiment, an annotation 602 may be associated with a point earlier in the game than an interest peak. For example, if the annotation 602 is used to launch the game or display saved screen output 504, it may be desirable that the game or display begin before the interest peak, whether it is a punchline of a joke or a point at which the players and/or spectators are surprised by a monster. How much the annotation 602 should be temporally offset from the interest peak may be predetermined or predicted by the ML model 703, which may then be subject to feedback, as described hereafter.

The interest levels may correspond to levels of activity. For example, in the case of spectators, the number and/or frequency of comments may be a proxy for the interest level. In the case of players, the interest level may correspond to the frequency of input, repeats of types of inputs, occurrences of input patterns, combination inputs (e.g., combo keys), motion vectors, pressure exerted on a controller, and/or the like. For both players and spectators, the live game feedback 706 may include, without limitation, audible feedback, visual feedback, motion feedback, textual feedback, and/or vital signs feedback, all of which may indicate varying levels of interest at different points within the video game. In some cases, live game feedback may be based on user interactions with the game play, such as to pause or replay portions of the game play. In some cases, the live game feedback may include feedback based on user interactions with buffered or recorded game play, such as watching a delayed or recorded game play session.

The audible feedback may be captured, for example, by a microphone 707A associated with a game console, game controller, or VR headset, and may include verbal expressions of excitement and/or various emotions experienced while playing or watching the video game, such as happiness, sadness, fear, disgust, and anger. Likewise, the visual feedback may include emotional expressions on a player's or spectator's face (e.g., a smile), eye tracking (as an indicator of attention or engagement), and the like, which may be captured by a camera 707B associated with the game console, game controller, or VR headset.

The motion feedback may be obtained from a motion sensor 707C, such as one or more accelerometers, magnetometers, cameras, and/or gyroscopes, associated with the game console, game controller, or VR headset. The textual feedback may be any form of commentary including, without limitation, chats, emails, direct messages, ratings, and the like, which may be received via a user input device 707D, such as a game controller in conjunction with a displayed virtual keyboard, but may also include physical keyboards, mice, touch screens, or the like. The vital signs feedback may be any vital signs (e.g., heart rate or temperature) obtained via a vital signs monitor 707E (e.g., smart watch, smart ring, or suitably equipped game controller) monitoring the player or spectator during the game.

Data from the input devices 707A-E may be aggregated by an input processor 708, which may include one or more microprocessors, I/O controllers, network controllers, software modules, and/or the like. Various levels of processing of the data from the input devices 707A-E may be performed by the input processor 708 before passing on data generated from the processing with all, none, or portions of the raw data from the input devices 707A-E. For example, the input processor 708 may only pass on raw data that exceeds certain threshold levels of amount, frequency, intensity, and/or the like. In one embodiment, the input processor 708 may identify a location within the video game at which interest of one or more players or spectators exceeds a predetermined threshold. In some cases, the predetermined threshold may be determined by artificial intelligence (AI) analysis of game play, and may include other factors, such as player interactions and/or spectator interactions. The game play analyzed by AI may include game play across multiple players to determine a threshold for a game title or portion of a game title and/or may include game play by a particular player to create a threshold that is customized for the particular player.

The ML model 703 may have been previously trained using predetermined or automatically generated annotations 602, as well as indications of whether those annotations were deemed by a human (or another AI) to be correct. For example, if the ML model 703 judged a particular point within the video game to be "sad," a human may confirm or reject the judgment, which is fed back into the ML model 703 so that it more accurately predicts the sentiment in the future.

Figure 7C:
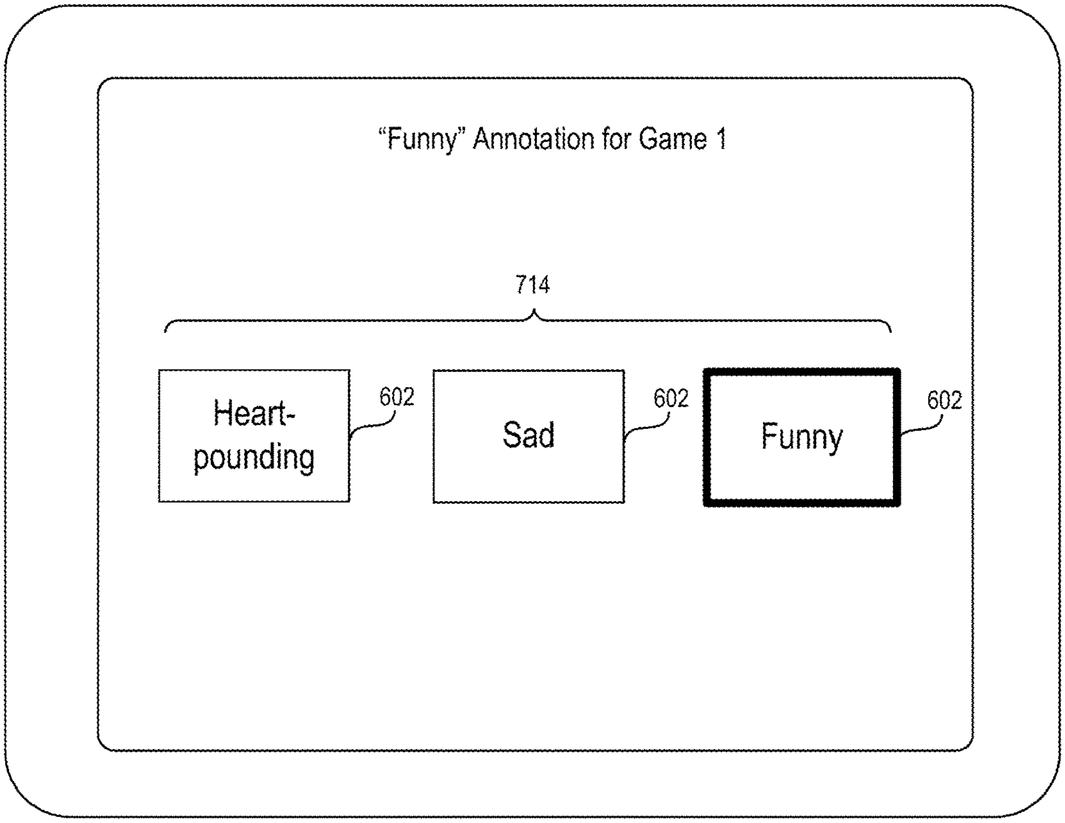
FIG. 7C illustrates an interface for displaying a timeline of annotations for a video game.

Although the ML model 703 may be pre-trained in many embodiments, it may be further refined in response to explicit or implicit annotation feedback 712 provided by a player or spectator with respect to a particular annotation 602. As shown in FIG. 7C, a timeline 714 or list of the annotations 602 for a particular game or game fragment may be displayed in response to a user selection. The annotations 602 may be filtered by user-specified criteria, e.g., funny, sad, hints, such that only the desired annotations 602 are displayed. Furthermore, the displayed annotation 602 may indicate the associated sentiment, e.g., heart-pounding, sad, funny.

In some embodiments, the user may select one of the annotations 602 in order to launch the game at a location associated with the annotation 602 (e.g., using an associated game state 606) and play the game from that point. Alternatively, or in addition, the user may choose to watch the screen output 504 saved in connection with the recorded game 704 at the point associated with the annotation 602.

Figure 7D:
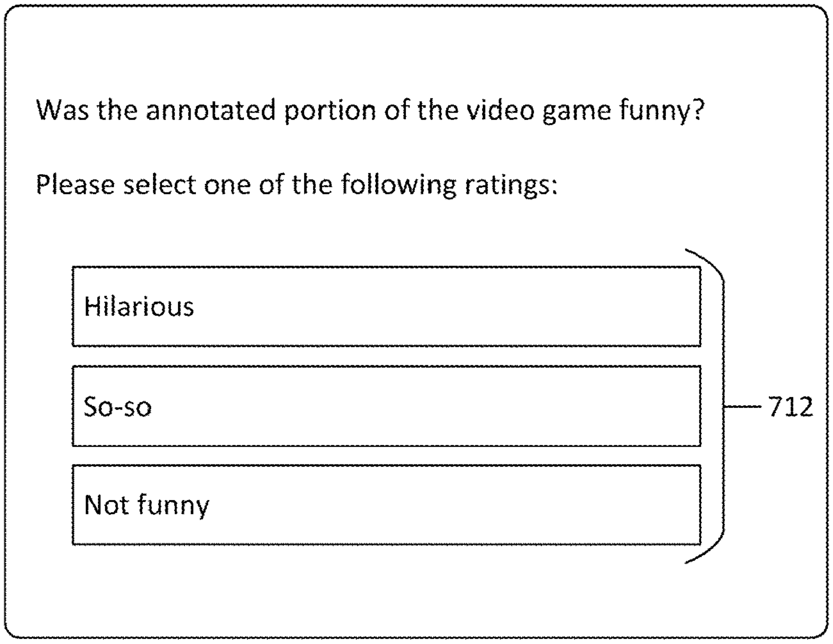
FIG. 7D illustrates an interface for receiving feedback relating to an annotation.

Thereafter, the user may provide explicit and/or implicit annotation feedback 712 for the sentiment associated with the annotation 602. Explicit annotation feedback 712 may be in the form of a rating, such as a graphic rating, a numerical rating, a descriptive rating, and/or a comparative rating. For example, as shown in FIG. 7D, the user may provide explicit feedback about whether an annotated portion of the video game was "funny" as predicted by the annotation 602.

Implicit annotation feedback 712 may include any of the forms of live game feedback 706, e.g., audible feedback, visual feedback, motion feedback, textual feedback, and/or vital signs feedback. In some cases, implicit feedback 712 may contradict explicit feedback 712. For example, a user may affirm that a joke was hilarious but be recorded saying something to the contrary. In such a case, the AI engine 702 may ignore the contradictory feedback, select one type of feedback over the other (e.g., implicit feedback supersedes explicit feedback) and/or determine a weighted feedback by assigning different weights to distinct types of feedback.

Referring again to FIG. 7A, the annotation feedback 712 is then used to update the ML model 703 of the AI engine 702, such that the ML model 703 will generate annotations 602 with predicted sentiments that are more likely to be deemed correct in the future. For example, if the annotation feedback 712 confirmed the sentiment reflected in the annotation 602, the logic (e.g., neurons, nodes, weights) used by the ML model 703 to generate the annotation 602 will be strengthened, making it more likely that a similar annotation 602 will be generated in the future for similar input. Conversely, if the annotation feedback 712 contradicts the sentiment reflected in the annotation 602, the logic used by the ML model 703 to generate the annotation 602 will be weakened, making it less likely that the annotation 602 will be generated for similar input in the future.

Figure 7E:
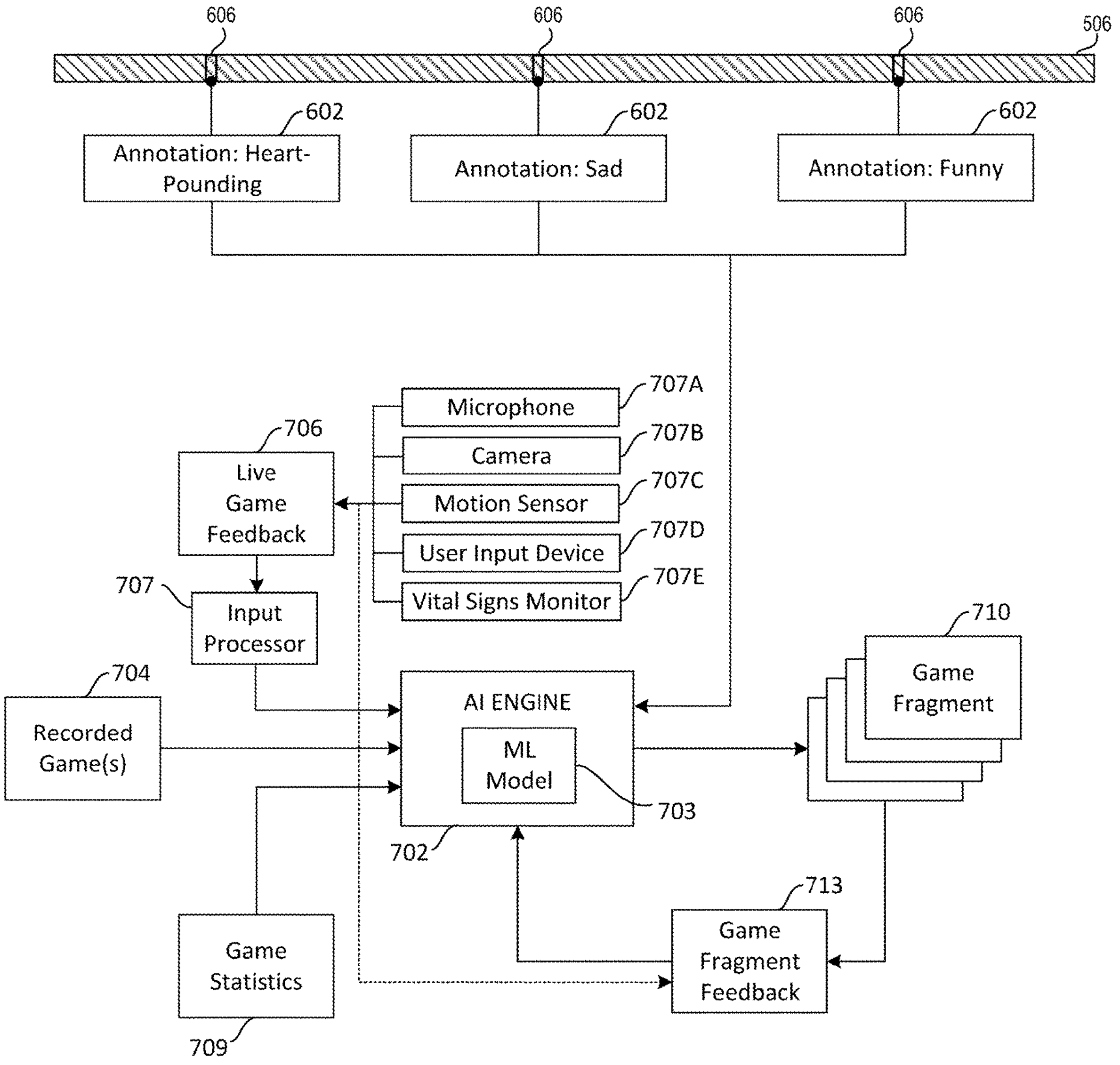
FIG. 7E illustrates a system for automatically generating video game fragments.

As illustrated in FIG. 7E, annotations 602 reflecting player and/or spectator sentiment may be used to automatically generate playable game fragments as an alternative or in addition to the game fragments being created manually (FIG. 4B). An artificial intelligence (AI) engine 702, which may be similar to the AI engine 702 of FIG. 7A, may receive various input including, without limitation, a recorded game 704, live game feedback 706, game statistics 709, and one or more annotations 602 indicating player and/or spectator sentiment at interest peaks within the video game, i.e., points at which interest exceeds a predetermined threshold.

The AI engine 702 may include or have access to a trained ML model 703, such as a large language model (LLM), bi-directional transformer, zero/few shot learner, or deep neural network (DNN). The ML model 703 may be used by the AI engine 702 to predict one or more game fragment(s) 710 of the recorded game 704 that will result in higher completion rates, increased positive feedback, greater activity, and/or more positive ratings by users or a particular user. The ML model 703 may have been previously trained using predetermined or automatically generated fragments of the recorded game 704, as well as indications of whether those fragments were completed by users, produced positive feedback, resulted in elevated levels of activity, and/or received high ratings by users.

The recorded game 704 may include recorded gameplay by one or more human players, as described in connection with FIG. 4A. In certain embodiments, at least some of the recorded game 704 may have been completed by AI players, which evaluate gameplay output and produce user input in the same manner as a human player.

The live game feedback 706 may have been captured contemporaneously from one or more human users playing the recorded game 704. For example, as discussed with reference to FIG. 7A, the live game feedback 706 may include, without limitation, audible feedback, visual feedback, motion feedback, textual feedback, and/or vital signs feedback, all of which may indicate excitement, interest, enjoyment, and/or engagement of the user with the video game at the time the live game feedback 706 is received.

The game statistics 709 may include, without limitation, information about the structure of the recorded game 704 (as shown in FIG. 4A) including the level and/or scene structure, activity levels within various game sections (i.e., which sections of the video game are played the most or generate the most input data), points at which user(s) quit playing the recorded game 704, points at which user(s) completed a game section at a lower (or higher) than average time, user feedback or ratings for the recorded game 704 or sections thereof, and the like.

Based on the various inputs, the ML model 703 of the AI engine 702 may output game fragments 710 (e.g., time ranges and/or indications of levels, scenes, or portions thereof) that are predicted to have higher completion rates, increased positive feedback, greater activity, and/or more positive ratings by users or a particular user.

Figure 7F:
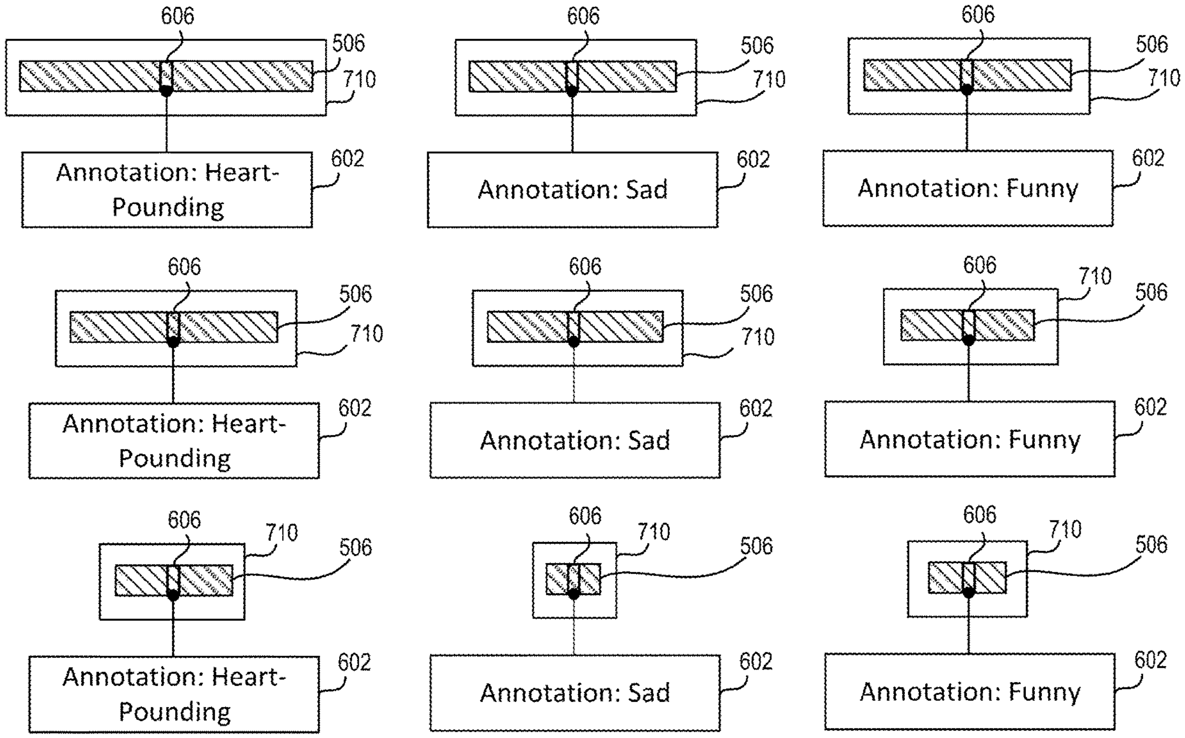
FIG. 7F illustrates a plurality of automatically generated video game fragments of different lengths.

As shown in FIG. 7F, the game fragments 710 may be of different lengths (e.g., estimated playtimes) in order to provide for various time budgets available to different users. For example, a game fragment 710 may include an entire scene that takes an average of 30 minutes to complete or a subset of the scene that takes only 10 minutes to complete. In some embodiments, game fragments 710 may be generated for both a scene and the subset of the scene, which may appeal to users with different time budgets.

In certain embodiments, each game fragment 710 may be associated with a respective annotation 602 of player/spectator sentiment since those annotations 602 correspond to interest peaks and may be predicted to be appealing to many players. However, this is not required in every embodiment, nor do game fragments 710 need to be centered around the point of the annotations 602 as shown. In certain embodiments, game fragments 710 may be associated with multiple annotations 602. In any case, the game fragments 710 may be still associated with their respective annotations 602 since the game states 606 may be identical to the original points within the full video game.

The game fragment(s) 710 output by the AI engine 702 may be used in accordance with the techniques described in FIG. 5A to create game fragment code playable by the user as a minigame. For example, the game state analyzer analyzes the game state of the game fragment and based on the analysis, the game breakpoint processor determines appropriate breakpoints to define the beginning and ending of the game fragment. Based on the operation of the game state analyzer, the game breakpoint processor, and the game set up state processor, the code assembly manager assembles various code portions to define the game fragment code. The game fragment code is fully self-contained, including all code portions that are required to execute the game fragment 710.

The created game fragment(s) 710 may be stored in a video game library 312, as shown in FIG. 3. The game fragment(s) 710 are then available to users to play, including users that may not have sufficient time to play entire games, but are nevertheless interested in playing discrete portions of games including specific challenges, puzzles, and the like.

Once a game fragment 710 is played by a user, the user may provide explicit and/or implicit game fragment feedback 713. Explicit game fragment feedback 713 may be in the form of a rating, such as a graphic rating, a numerical rating, a descriptive rating, and/or a comparative rating. Implicit game fragment feedback 713 may include whether the user completed the game fragment 710 (non-completion may be considered negative feedback in some embodiments) and/or the live game feedback 706 described in connection with FIG. 7A, such as audible feedback, visual feedback, motion feedback, textual feedback, and/or vital signs feedback. Occasionally, some game fragment feedback 713 may be positive (e.g., the user completed the minigame), while other game fragment feedback 713 suggests otherwise (e.g., the audible feedback has verbal cues indicating that the user did not enjoy the game fragment 710). The negative implicit game fragment feedback 713 may take precedence in some embodiments as being more accurate or relevant. Alternatively, various positive and negative feedback may be assigned different weights to determine an overall game fragment feedback 713 for the user. In some cases, the user may rate different aspects of the same game fragment 710, which may result in some aspects being rated positively and some aspects being rated negatively, such as rating the puzzle elements as being very enjoyable but the combat elements as being too difficult.

As shown in FIG. 7E, the game fragment feedback 713 is then used to update the ML model 703 of the AI engine 702, such that the ML model 703 will generate game fragments 710 in the future that have higher completion rates, increased positive feedback, greater activity, and/or more positive ratings. For example, if the game fragment feedback 713 was positive, the logic (e.g., neurons, nodes, weights) used by the ML model 703 to generate the game fragment 710 will be strengthened, making it more likely that similar game fragments 710 will be generated in the future for similar input. Conversely, if the game fragment feedback 713 was negative, the logic used by the ML model 703 to generate the game fragment 710 will be weakened, making it less likely that the game fragment 710 will be generated for similar input in the future.

Figure 7G:
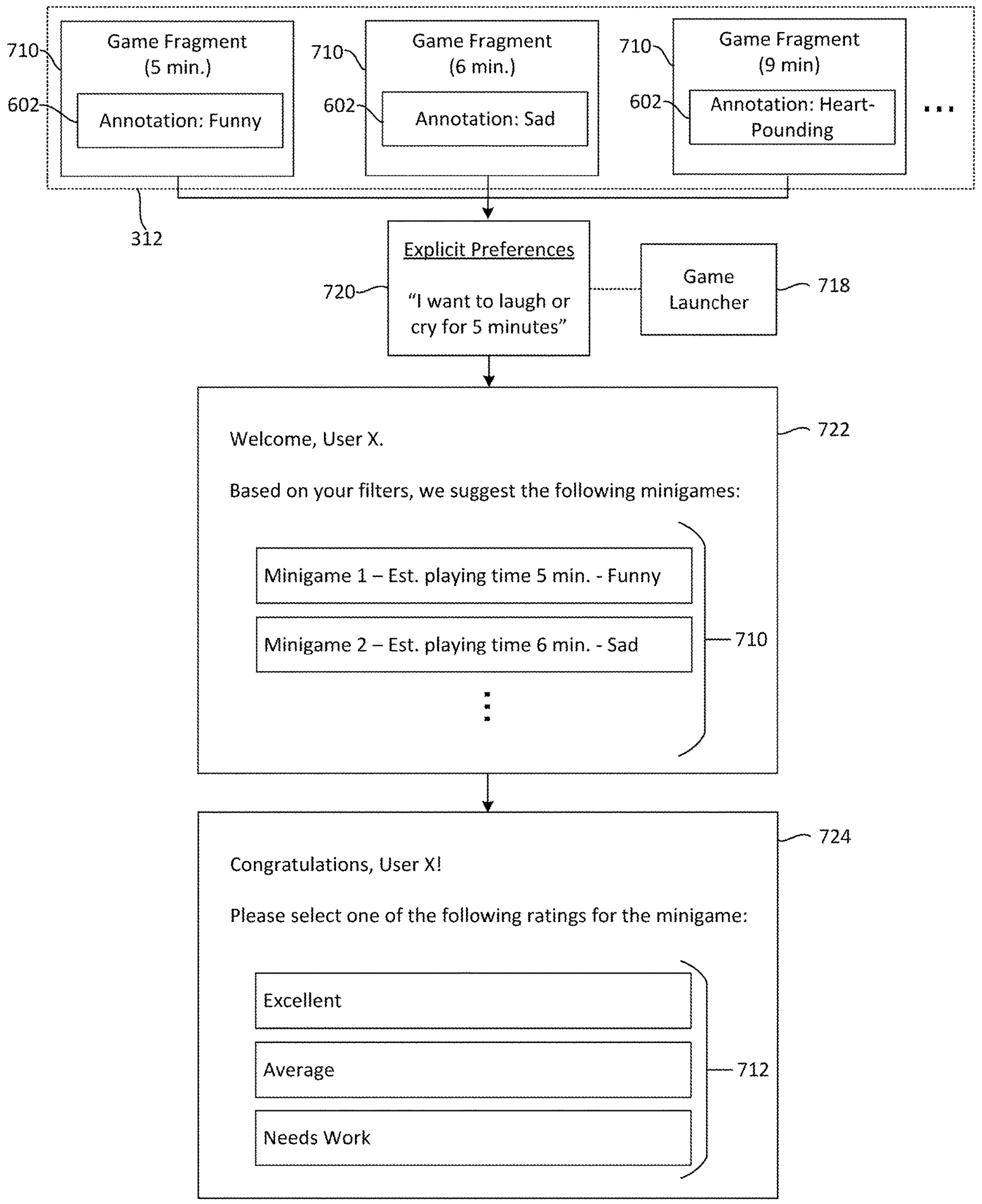
FIG. 7G illustrates a process of identifying a playable game fragment that satisfies explicit user preferences.

As shown in FIG. 7G, annotations 602 may allow a player to search for game fragment 710 associated with one or more desired sentiments. For example, a game library 312 may include a number of game fragments 710 generated using the process shown in FIG. 7E. The player may run a game launcher 718, which is an application configured to assist the player with identifying a game that fits their interest and time availability. In the present example, the player may specify one or more explicit preferences 720, e.g., "I want to laugh or cry for 5 minutes."

The game launcher 718 may search the game library 312 for game fragments 710 satisfying the one or more explicit preferences 720. If one or more matches are found, they may be displayed in an interface 722 provided by the game launcher 718. In some embodiments, the game launcher 718 may be configured to list game fragments 710 that match or substantially match the one or more explicit preferences 720 within a degree of tolerance. For example, although the user indicated that they desired a 5 minute experience, a tolerance factor (e.g., +/−2 minutes), which may be user specified or determined from the player's historical choices, may allow a 6-minute game fragment to be displayed, but not a 9-minute game fragment 710. The interface 722 may list the estimated playing times and/or sentiments associated with the respective annotations 602.

Once the user has played a selected game fragment 710, the game launcher 718 may provide another interface 724 to allow the user to provide explicit game feedback 712 in the form of a rating, e.g., excellent, average, needs work. Alternatively, as described above, the game feedback 712 may be implicitly derived from live game feedback 706 and/or whether and to what extent the player completed the selected game fragment 710.

Figure 7H:
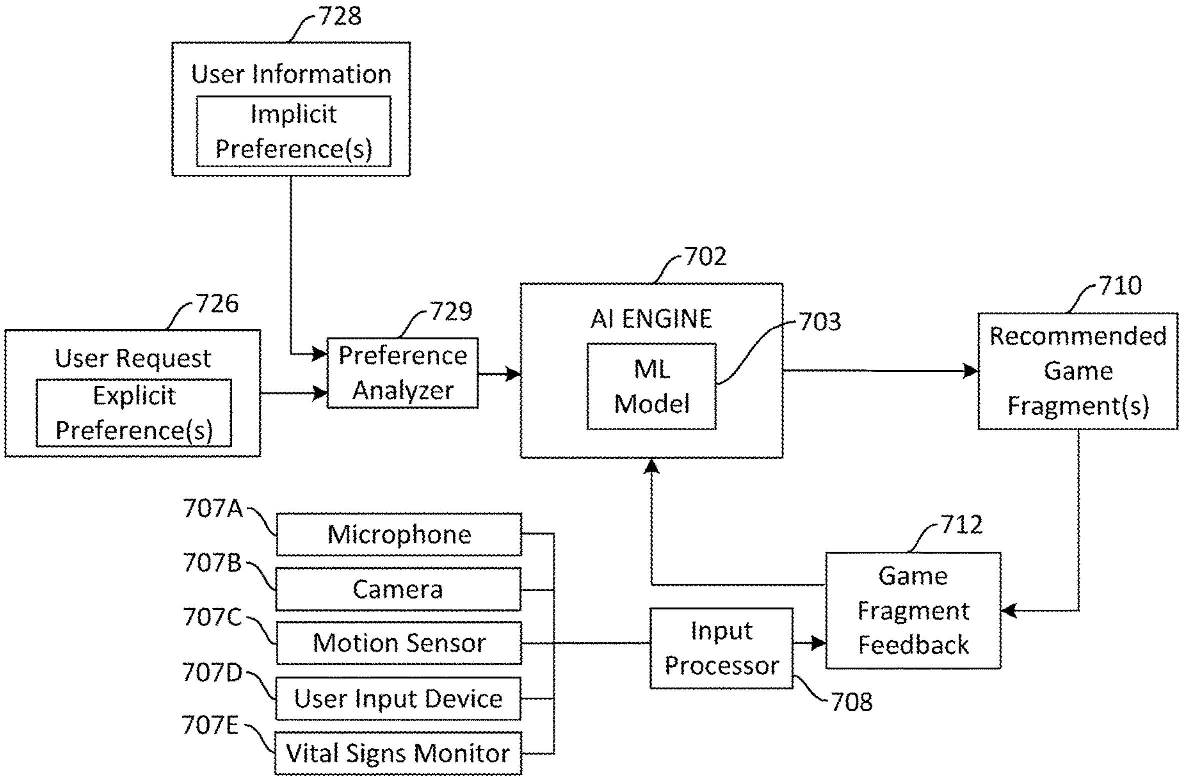
FIG. 7H illustrates a system for automatically recommending one or more playable game fragments based on explicit and/or implicit user preferences.

In other embodiments, the user may not need to provide explicit preferences 720 to the game launcher 718. Referring to FIG. 7H, an AI engine 702 (which may be similar to the AI engine 702 of FIG. 7A) may recommend at least one game fragment 710 to a user that is likely to be completed, receive positive feedback, and/or be positively rated by the user based on implicit preferences known by the AI engine 702 about the user.

In one embodiment, the AI engine 702 receives a user request 726, which may be a result of the user signing into the video game console and/or activating the game launcher 718. The user request 726 may nevertheless include some explicit preferences for a video gaming session, while other preferences may be implicit. For example, the user request 726 may include a specific amount of time that the user has to play, e.g., 10 minutes, 30 minutes, or one hour. Likewise, the user request 726 may include a specific type of game (e.g., role-playing, platform, action, adventure, first-person shooter, sports, simulation, fighting) and/or a specific game title that the user wishes to play in the time they have available. In certain embodiments, the request 726 may include a specific interest that the user has for the gaming session, e.g., consumption of time, improving their skill set, challenge, advancement, time trial (e.g., speed run), or the like.

Alternatively, or in addition, any or all of the foregoing may be inferred from user information 728 available to the AI engine 702. For example, the user information 728 may include the user's schedule (e.g., from a calendar application), historical data about the user's playing habits (e.g., the user typically plays for an hour at the same time each day), etc. The user information 728 may further include historical data about the types and/or genres of games the user likes to play, a most recent game title being played by the user, and/or specific interests of the user relating to gaming sessions. In some embodiments, the user information 728 further includes information about the user's skill level, games played, achievements won, previous user feedback on games and game fragments, etc.

In certain embodiments, the explicit and implicit preferences may be aggregated and analyzed by a preference analyzer 729, which may include one or more microprocessors, I/O controllers, network controllers, software models, and/or the like. The preference analyzer 729 may be a standalone module or may be part of the AI engine 702. In certain embodiments, the preference analyzer 729 may determine a user's explicit and/or implicit preferences without the use of the AI engine 702.

In some cases, the user's calendar application may have set aside time for the gaming session, which can be accessed and used to determine the available time without user input. In some cases, more than one users and/or their friends' calendar application may set aside time for a team gaming session. Alternatively, or in addition, historical user behavior can be used by the AI engine 702 to determine the probable available time and/or goal for the gaming session. For example, if the user typically plays a gaming session for 60 minutes after work, the AI engine 702 may use a ML model 703 trained with prior user behavior to determine the available time for the gaming session.

Using a ML model 703, the AI engine 702 may select a previously created game fragment 710 and/or create a new game fragment 710 (using the techniques discussed in connection with FIG. 7E) based a perceived match with the explicit and/or implicit preferences reflected in the user request 726 and user information 728. In certain embodiments, the user may be provided with multiple recommended game fragments 710, e.g., game fragments 710 of different lengths, genres, goals, titles, etc., that align with the user's explicit or implicit interests, including time availability. The recommended game fragments 710 may then be used in accordance with the techniques described in FIG. 5A to create game fragment code playable by a user as a minigame.

Once a minigame is played by the user, the user may provide explicit and/or implicit game fragment feedback 713. Explicit game fragment feedback 713 may be in the form of a rating (e.g., numerical rating or star rating) and/or an indication of whether the user completed the minigame. Non-completion of the minigame may be considered negative feedback in some embodiments. Implicit game fragment feedback 713 may be similar or identical to the live game feedback 706 described in connection with FIG. 7A, such as audible feedback, visual feedback, motion feedback, textual feedback, and/or vital signs feedback.

The game fragment feedback 713 is then used to update the ML model 703 of the AI engine 702, such that the AI engine 702 will recommended game fragments 710 in the future that have higher completion rates, increased positive feedback, greater activity, and/or more positive ratings. In other words, if the game fragment feedback 713 was positive, the logic (e.g., neurons, nodes, weights) used by the ML model 703 to recommend the game fragment 710 will be strengthened, making it more likely that similar game fragments 710 will be recommended in the future for similar input. Conversely, if the game fragment feedback 713 was negative, the logic used by the ML model 703 to recommend the game fragment 710 will be weakened, making it less likely that the game fragment 710 will be recommended for similar input in the future.

Figure 8:
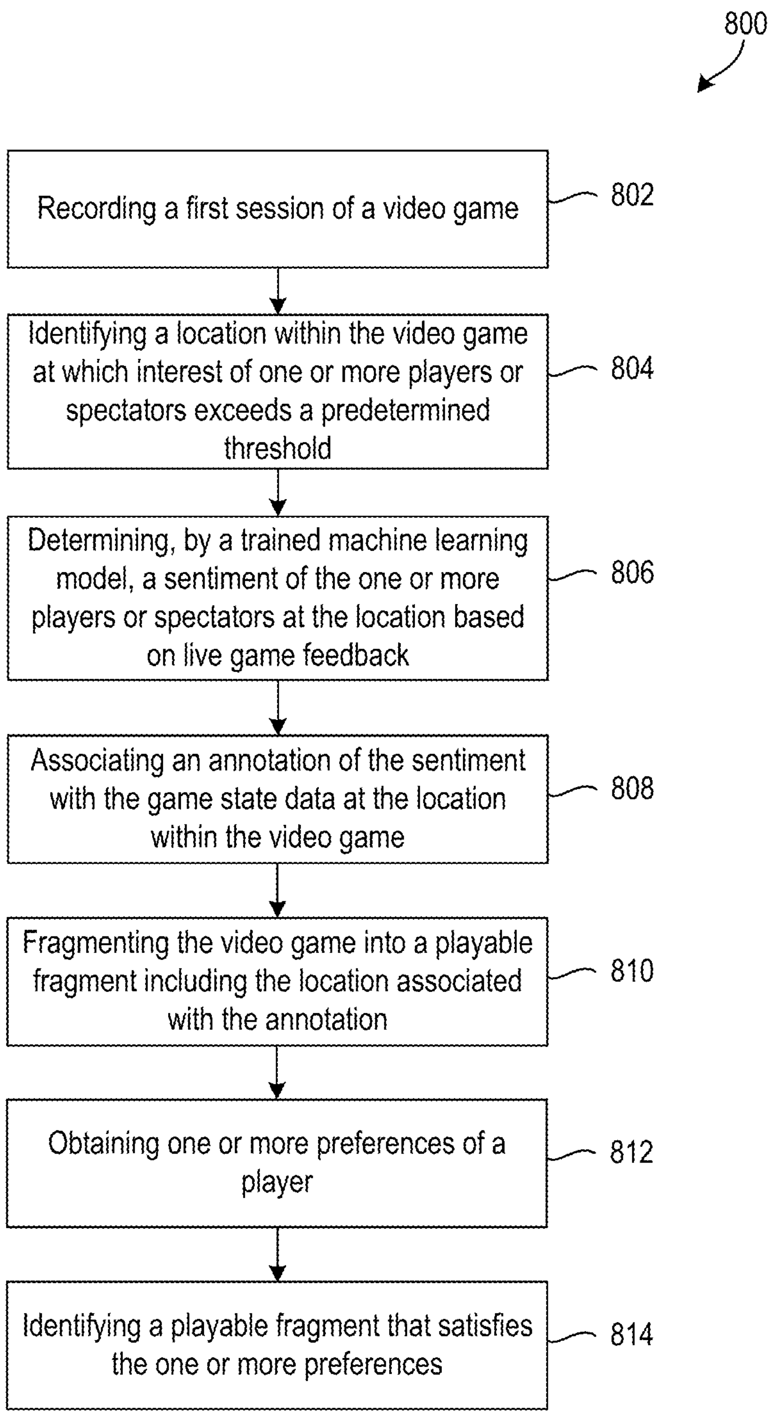
FIG. 8 illustrates a flowchart of a method for annotating and fragmenting a video game.

FIG. 8 is a flowchart of a method 800 for annotating a video game with indications of player and/or spectator sentiment, as well as generating a playable fragment of the video game based on the annotation, which can then be selected by a user according to explicit or implicit preferences. According to some examples, the method 800 includes recording 802 a first session of the video game including game state data generated by processing player input data by a video game processor. As previously described, the first session may be played and recorded by the author of the annotation, another user, or an automated process.

The method 800 continues by identifying 804 a location within the video game at which interest of one or more players or spectators exceeds a predetermined threshold. The location may correspond to an interest "peak," which may be determined, in one embodiment, by levels of activity and/or live game feedback. Examples of live game feedback may include audible feedback, visual feedback, motion feedback, textual feedback, and/or vital signs feedback. The identifying a location within the video game may be based on data from game play by players, which may be live or recorded. The identifying a location within the video game may be based on spectator interaction with game play, which may be live game play or recorded game play. In some cases, a player may indicate a location in game play while playing the game or during replay of a recording of game play to indicate a location within the video game of interest.

The method 800 continues by determining 806, by a trained machine learning model, a sentiment of the one or more players or spectators at the location based on the live game feedback, followed by associating 808 an annotation of the sentiment with the game state data at the location within the video game.

In one embodiment, the method 800 continues by fragmenting 810 the video game into a playable fragment including the location associated with the annotation. The fragmentation may be performed by the trained machine learning model or another machine learning model based on one or more of the annotation or the live game feedback.

The method 800 continues by obtaining 812 one or more preferences of a player for a gaming session. The one or more preferences may be explicit or implicit. In some embodiments, implicit preferences may be determined by the trained machine learning model or another machine learning model based, for example, on historical player data, player calendar data, live game feedback, and/or the like.

The method 800 continues by identifying 814 identifying a playable fragment that satisfies the one or more preferences. The identification may be performed by the trained machine learning model or another machine learning model based, for example, on the explicit or implicit preferences of the player, historical player data, live game feedback, and/or the like. The machine learning model(s) discussed herein may be updated in response to feedback regarding the annotation, e.g., whether the sentiment of the annotation comports with the sentiment of the game or game fragment and/or whether the playable fragment satisfies the user's explicit or implicit preferences.

Figure 9:
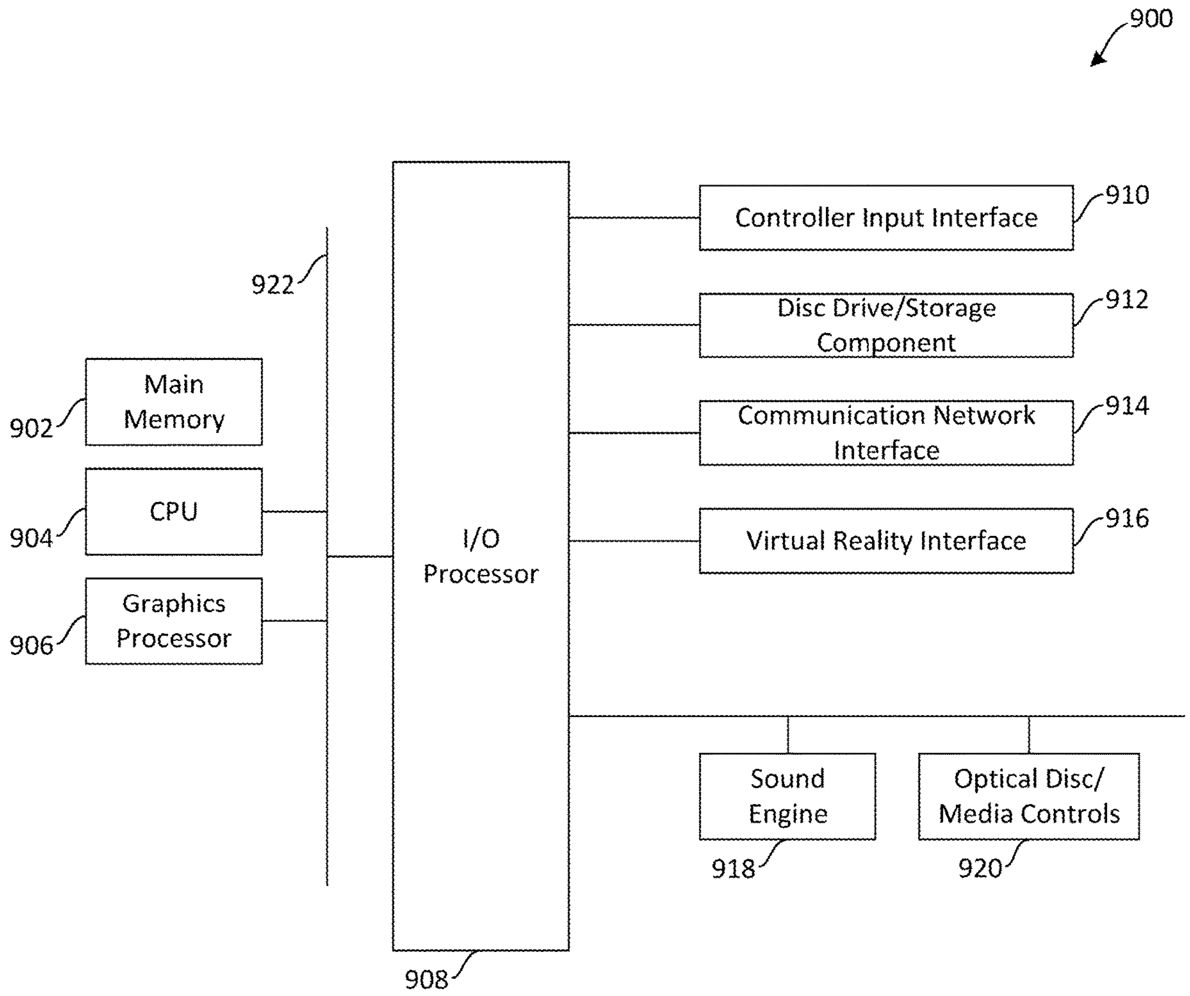
FIG. 9 illustrates a block diagram of an exemplary electronic entertainment system.

FIG. 9 illustrates a block diagram of an exemplary electronic entertainment system 900, which may be used in the context of the cloud gaming system shown in FIG. 2. The electronic entertainment system 900 as illustrated in FIG. 9 includes a main memory 902, a central processing unit (CPU) 904, graphic processor 906, an input/output (I/O) processor 908, a controller input interface 910, a hard disc drive or other storage component 912 (which may be removable), a communication network interface 914, a virtual reality interface 916, sound engine 918, and optical disc/media controls 920. Each of the foregoing are connected via one or more system buses 922.

Electronic entertainment system 900 as shown in FIG. 9 may be an electronic game console. The electronic entertainment system 900 may alternatively be implemented as a general-purpose computer, a set-top box, a hand-held game device, a tablet computing device, or a mobile computing device or phone. Electronic entertainment systems may contain some or all of the disclosed components depending on a particular form factor, purpose, or design.

Main memory 902 stores instructions and data for execution by CPU 904. Main memory 902 can store executable code when the electronic entertainment system 900 is in operation. Main memory 902 of FIG. 9 may communicate with CPU 904 via a dedicated bus. Main memory 902 may provide pre-stored programs in addition to programs transferred through the I/O processor 908 from hard disc drive/storage component 912, a DVD or other optical disc (not shown) using the optical disc/media controls 920, or as might be downloaded via communication network interface 914.

The graphics processor 906 of FIG. 9 (or graphics card) executes graphics instructions received from the CPU 904 to produce images for display on a display device (not shown). The graphics processor 906 of FIG. 9 may transform objects from three-dimensional coordinates to two-dimensional coordinates, and vice versa. Graphics processor 906 may use ray tracing to aid in the rendering of light and shadows in a game scene by simulating and tracking individual rays of light produced by a source. Graphics processor 906 may utilize fast boot and load times, 4K-8K resolution, and up to 120 FPS with 120 hz refresh rates. Graphics processor 906 may render or otherwise process images differently for a specific display device.

I/O processor 908 of FIG. 9 may also allow for the exchange of content over a wireless or other communications network (e.g., IEEE 802.x inclusive of Wi-Fi and Ethernet, 9G, 4G, LTE, and 3G mobile networks, and Bluetooth and short-range personal area networks). The I/O processor 908 of FIG. 9 primarily controls data exchanges between the various devices of the electronic entertainment system 900 including the CPU 904, the graphics processor 906, controller interface 910, hard disc drive/storage component 912, communication network interface 914, virtual reality interface 916, sound engine 918, and optical disc/media controls 920.

A user of the electronic entertainment system 900 of FIG. 9 provides instructions via a controller device communicatively coupled to the controller interface 910 to the CPU 904. A variety of different controllers may be used to receive the instructions, including handheld and sensor-based controllers (e.g., for capturing and interpreting eye-tracking-based, voice-based, and gestural commands). Controllers may receive instructions or input from the user, which may then be provided to controller interface 910 and then to CPU 904 for interpretation and execution. The instructions may further be used by the CPU 904 to control other components of electronic entertainment system 900. For example, the user may instruct the CPU 904 to store certain game information on the hard disc drive/storage component 912 or other non-transitory computer-readable storage media. A user may also instruct a character in a game to perform some specified action, which is rendered in conjunction with graphics processor 906, inclusive of audio interpreted by sound engine 918.

Hard disc drive/storage component 912 may include removable or non-removable non-volatile storage medium. Saud medium may be portable and inclusive of digital video disc, Blu-Ray, or USB coupled storage, to input and output data and code to and from the main memory 902. Software for implementing embodiments of the present invention may be stored on such a medium and input to the main memory via the hard disc drive/storage component 912. Software stored on a hard disc drive may also be managed by optical disk/media control 920 and/or communications network interface 914.

Communication network interface 914 may allow for communication via various communication networks, including local, proprietary networks and/or larger wide-area networks such as the Internet. The Internet is a broad network of interconnected computers and servers allowing for the transmission and exchange of Internet Protocol (IP) data between users connected through a network service provider. Examples of network service providers include public switched telephone networks, cable or fiber services, digital subscriber lines (DSL) or broadband, and satellite services. Communications network interface allows for communications and content to be exchanged between the various remote devices, including other electronic entertainment systems associated with other users and cloud-based databases, services and servers, and content hosting systems that might provide or facilitate game play and related content.

Virtual reality interface 916 allows for processing and rendering of virtual reality, augmented reality, and mixed reality data. This includes display devices such that might be partial or entirely immersive virtual environments. Virtual reality interface 916 may allow for exchange and presentation of immersive fields of view and foveated rendering in coordination with sounds processed by sound engine 918 and haptic feedback.

Sound engine 918 executes instructions to produce sound signals that are outputted to an audio device such as television speakers, controller speakers, stand-alone speakers, headphones, or other head-mounted speakers. Different sets of sounds may be produced for each of the different sound output devices. This may include spatial or three-dimensional audio effects.

Optical disc/media controls 920 may be implemented with a magnetic disk drive or an optical disk drive for storing, managing, and controlling data and instructions for use by CPU 904. Optical disc/media controls 920 may be inclusive of system software (an operating system) for implementing embodiments of the present invention. That system may facilitate loading software into main memory 902.

The systems and methods described herein can be implemented in hardware, software, firmware, or combinations of hardware, software and/or firmware. In some examples, systems described in this specification may be implemented using a non-transitory computer readable medium storing computer executable instructions that when executed by one or more processors of a computer cause the computer to perform operations. Computer readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
recording a first session of a video game, the first session including game state data generated by processing player input data by a video game processor;
identifying a location within the video game at which interest of one or more players or spectators exceeds a predetermined threshold including identifying an interest peak for the one or more players or spectators;
determining, by a trained machine learning model, a sentiment of the one or more players or spectators at the location based on live game feedback; and
associating an annotation of the sentiment with the game state data at the location within the video game.

2. The computer-implemented method of claim 1, wherein the live game feedback includes audio recorded by a microphone associated with a client device used to play the first session.

3. The computer-implemented method of claim 1, wherein the live game feedback includes video recorded by a camera associated with a client device used to play the first session.

4. The computer-implemented method of claim 1, wherein the live game feedback includes motion recorded by a motion sensor associated with a client device used to play the first session.

5. The computer-implemented method of claim 1, wherein the live game feedback includes text recorded by an input device associated with a client device used to play the first session.

6. The computer-implemented method of claim 1, wherein the live game feedback includes vital sign data recorded by a vital sign monitor associated with a client device used to play the first session.

7. The computer-implemented method of claim 1, further comprising:
fragmenting the video game into a playable fragment including the location associated with the annotation.

8. The computer-implemented method of claim 7, wherein fragmenting the video game includes generating a plurality of playable fragments of different lengths.

9. The computer-implemented method of claim 7, wherein fragmenting the video game includes:
determining boundaries for the playable fragment within a gameplay context of the video game; and
generating the playable fragment having the determined boundaries.

10. The computer-implemented method of claim 9, wherein determining the boundaries is performed by the trained machine learning model or another machine learning model based on one or more of the annotation or the live game feedback.

11. The computer-implemented method of claim 8, further comprising:
obtaining one or more preferences of a player; and
identifying a playable fragment of the plurality of playable fragments that satisfies the one or more preferences.

12. The computer-implemented method of claim 11, wherein the one or more preferences include a preferred sentiment for the playable fragment, and wherein identifying the playable fragment includes identifying the playable fragment based on the sentiment of an associated annotation.

13. The computer-implemented method of claim 11, wherein the one or more preferences include a preferred playing time for the playable fragment, and wherein identifying the playable fragment includes identifying the playable fragment having a playing time that is within a threshold amount of the preferred playing time.

14. The computer-implemented method of claim 11, wherein obtaining the one or more preferences includes determining at least one implicit preference of the player.

15. The computer-implemented method of claim 14, wherein the at least one implicit preference includes a preferred playing time, wherein the preferred playing time is determined from at least one of player calendar data and player historical data.

16. The computer-implemented method of claim 11, wherein identifying the playable fragment includes identifying the playable fragment using the trained machine learning model or a second machine learning model based on a perceived match with the one or more preferences.

17. The computer-implemented method of claim 16, further comprising:
receiving feedback from the player relating to whether the playable fragment satisfied the one or more preferences; and
updating the trained machine learning model or the second machine learning model based on the feedback relating to the playable fragment.

18. The computer-implemented method of claim 1, further comprising:
receiving feedback from a player of a second session of the video game relating to whether the annotation correctly described the sentiment of the player at the location; and
updating the trained machine learning model based on the feedback.

19. The computer-implemented method of claim 1, further comprising:
generating a timeline of annotations for the first session that satisfy a set of criteria provided by a player;
receiving a selection by the player of a first annotation from the timeline; and
performing at least one of:
launching a second session of the video game at the location of the video game associated with the annotation; or
displaying recorded screen output of the first session of the video game at the location of the video game associated with the annotation.

20. A system comprising:
at least one processor; and
at least one computer-readable media having collectively stored thereon computer-readable instructions that, when executed with the at least one processor, collectively cause the system to:
record a first session of a video game, the first session including game state data generated by processing player input data;
identify a location within the video game at which interest of one or more players or spectators exceeds a predetermined threshold including identifying an interest peak for the one or more players or spectators;
determine, with a trained machine learning model, a sentiment of the one or more players or spectators at the location based on live game feedback; and
associate an annotation of the sentiment with the game state data at the location within the video game.

21. The system of claim 20, wherein the live game feedback includes audio, the system further comprising a microphone associated with a client device used to play the first session that records the audio.

22. The system of claim 20, wherein the live game feedback includes video, the system further comprising a camera associated with a client device used to play the first session that records the video.

23. The system of claim 20, wherein the live game feedback includes motion, the system further comprising a motion sensor associated with a client device used to play the first session that records the motion.

24. The system of claim 20, wherein the live game feedback includes text, the system further comprising an input device associated with a client device used to play the first session that receives the text.

25. The system of claim 20, wherein the live game feedback includes vital sign data, the system further comprising a vital sign monitor associated with a client device used to play the first session that records the vital sign data.

26. The system of claim 20, wherein the instructions further cause the system to:

fragment the video game into a playable fragment including the location associated with the annotation.

27. The system of claim 26, wherein the instructions further cause the system to fragment the video game into a plurality of playable fragments of different lengths.

28. The system of claim 26, wherein the instructions further cause the system to determine boundaries for the playable fragment within a gameplay context of the video game and generate the playable fragment having the determined boundaries.

29. The system of claim 28, wherein the system uses or includes an artificial intelligence (AI) engine including the trained machine learning model or another machine learning model to determine the boundaries based on one or more of the annotation or the live game feedback.

30. The system of claim 27, wherein the instructions further cause the system to obtain one or more preferences of a player and identify a playable fragment of the plurality of playable fragments that satisfies the one or more preferences.

31. The system of claim 30, wherein the one or more preferences include a preferred sentiment for the playable fragment, and wherein identifying the playable fragment includes identifying the playable fragment based on the sentiment of an associated annotation.

32. The system of claim 30, wherein the one or more preferences include a preferred amount of playing time for the playable fragment, and wherein identifying the playable fragment includes identifying the playable fragment having a playing time that is within a threshold amount of the preferred playing time.

33. The system of claim 30, wherein the system includes or uses an artificial intelligence (AI) engine including the trained machine learning model or a second machine learning model that identifies the playable fragment based on a perceived match with the one or more preferences.

34. The system of claim 33, wherein the AI engine receives feedback from the player relating to whether the playable fragment satisfied the one or more preferences and updates the trained machine learning model or the second machine learning model based on the feedback relating to the playable fragment.

35. The system of claim 29, wherein the AI engine receives feedback from a player of a second session of the video game relating to whether the annotation correctly described the sentiment of the player at the location and updates the trained machine learning model based on the feedback.

36. The system of claim 29, wherein the instructions further cause the system to:

generate a timeline of annotations for the first session that satisfy a set of criteria provided by a player;

receive a selection by the player of a first annotation from the timeline; and perform at least one of:

launching a second session of the video game at the location of the video game associated with the annotation; and displaying recorded screen output of the first session of the video game at the location of the video game associated with the annotation.

37. A computer-implemented method comprising:

recording a first session of a video game, the first session including game state data generated by processing player input data by a video game processor;

identifying a location within the video game at which interest of one or more players or spectators exceeds a predetermined threshold;

determining, by a trained machine learning model, a sentiment of the one or more players or spectators at the location based on live game feedback that includes vital sign data recorded by a vital sign monitor associated with a client device used to play the first session; and associating an annotation of the sentiment with the game state data at the location within the video game.

38. A system comprising:

at least one processor; and at least one computer-readable media having collectively stored thereon computer-readable instructions that, when executed with the at least one processor, collectively cause the system to:

record a first session of a video game, the first session including game state data generated by processing player input data;

identify a location within the video game at which interest of one or more players or spectators exceeds a predetermined threshold;

determine, with a trained machine learning model, a sentiment of the one or more players or spectators at the location based on live game feedback that includes vital sign data recorded by a vital sign monitor associated with a client device used to play the first session; and associate an annotation of the sentiment with the game state data at the location within the video game.

39. A computer-implemented method comprising:

recording a first session of a video game, the first session including game state data generated by processing player input data by a video game processor;

identifying a location within the video game at which interest of one or more players or spectators exceeds a predetermined threshold;

determining, by a trained machine learning model, a sentiment of the one or more players or spectators at the location based on live game feedback;

associating an annotation of the sentiment with the game state data at the location within the video game;

fragmenting the video game into a plurality of playable fragments of different lengths including a playable fragment that includes the location associated with the annotation;

obtaining one or more preferences of a player including determining at least one implicit preference of the player, the at least one implicit preference including a preferred playing time determined from at least one of player calendar data and player historical data; and identifying a playable fragment of the plurality of playable fragments that satisfies the one or more preferences.

40. A system comprising:

at least one processor; and at least one computer-readable media having collectively stored thereon computer-readable instructions that, when executed with the at least one processor, collectively cause the system to:

record a first session of a video game, the first session including game state data generated by processing player input data;

identify a location within the video game at which interest of one or more players or spectators exceeds a predetermined threshold;

determine, with a trained machine learning model, a sentiment of the one or more players or spectators at the location based on live game feedback;

associate an annotation of the sentiment with the game state data at the location within the video game;

fragment the video game into a plurality of playable fragments of different lengths including a playable fragment that includes the location associated with the annotation;

obtain one or more preferences of a player including determining at least one implicit preference of the player, the at least one implicit preference including a preferred playing time determined from at least one of player calendar data and player historical data; and identify a playable fragment of the plurality of playable fragments that satisfies the one or more preferences.

* * * * *